(12) United States Patent
Fine et al.

(10) Patent No.: US 11,628,930 B2
(45) Date of Patent: Apr. 18, 2023

(54) ACTIVE LIFT CONTROL DEVICE AND METHOD

(71) Applicant: Arctura, Inc., South Kingstown, RI (US)

(72) Inventors: Neal E. Fine, North Kingstown, RI (US); John A. Cooney, Jr., Warwick, RI (US)

(73) Assignee: Arctura, Inc., South Kingstown, RI (US)

( * ) Notice: Subject to any disclaimer, the term of this patent is extended or adjusted under 35 U.S.C. 154(b) by 0 days.

(21) Appl. No.: 17/323,611

(22) Filed: May 18, 2021

(65) Prior Publication Data

US 2022/0009618 A1   Jan. 13, 2022

Related U.S. Application Data

(62) Division of application No. 16/403,010, filed on May 3, 2019, now Pat. No. 11,014,652.

(60) Provisional application No. 62/666,472, filed on May 3, 2018.

(51) Int. Cl.
*F03D 7/02*  (2006.01)
*B64C 23/02*  (2006.01)
*F15D 1/00*  (2006.01)
*B64C 21/10*  (2006.01)
(Continued)

(52) U.S. Cl.
CPC .............. *B64C 23/02* (2013.01); *B64C 21/10* (2013.01); *B64C 23/08* (2013.01); *F03D 7/022* (2013.01); *F03D 7/0232* (2013.01); *F03D 7/0236* (2013.01); *F15D 1/002* (2013.01); *F15D 1/007* (2013.01); *F15D 1/0065* (2013.01); *B64C 2003/148* (2013.01); *B64C 2230/28* (2013.01); *F05B 2240/305* (2020.08); *F05B 2240/3062* (2020.08)

(58) Field of Classification Search
CPC ... B64C 23/02; B64C 2003/148; B64C 23/08; B64C 21/10; B64C 2230/28; F15D 1/007; F15D 1/002; F15D 1/0065; F03D 7/022; F03D 7/0232; F03D 7/0236; F05B 2240/305; F05B 2240/3062
USPC ...................................... 416/23, 24
See application file for complete search history.

(56) References Cited

U.S. PATENT DOCUMENTS

| | | |
|---|---|---|
| 1,846,562 A | 2/1932 | Longo |
| 1,866,869 A | 7/1932 | Thurston |
| 2,852,211 A | 9/1958 | Xenakis |

(Continued)

FOREIGN PATENT DOCUMENTS

| | | |
|---|---|---|
| FR | 719644 A | 2/1932 |
| FR | 880130 A | 3/1943 |
| WO | WO 2010/034749 A2 | 4/2010 |

*Primary Examiner* — Igor Kershteyn
*Assistant Examiner* — Theodore C Ribadeneyra
(74) *Attorney, Agent, or Firm* — Sunstein LLP

(57) ABSTRACT

A lift control device actively controls the lift force on a lifting surface. The device has a protuberance near a trailing edge of its lifting surface, which causes flow to separate from the lifting surface, generating regions of low pressure and high pressure which combine to increase the lift force on the lifting surface. The device further includes a means to keep the flow attached around the protuberance or to modify the position of the protuberance in response to a command from a central controller, so as to provide an active control of the lift between a maximum value and a minimum value.

6 Claims, 23 Drawing Sheets

(51) Int. Cl.
    *B64C 23/08*                 (2006.01)
    *B64C 3/14*                   (2006.01)

(56) References Cited

U.S. PATENT DOCUMENTS

| | | | |
|---|---|---|---|
| 2,928,626 A | 3/1960 | Tino | |
| 2,973,167 A | 2/1961 | Lake | |
| 3,162,402 A | 12/1964 | Alvarez-Calderon | |
| 3,179,354 A | 4/1965 | Alvaraz-Calderon | |
| 5,094,412 A | 3/1992 | Narramore | |
| 5,195,702 A | 3/1993 | Malvestuto, Jr. | |
| 5,236,149 A | 8/1993 | MacKay | |
| 5,253,828 A * | 10/1993 | Cox | B64C 23/06 244/214 |
| 5,294,080 A | 3/1994 | Ross | |
| 5,570,859 A * | 11/1996 | Quandt | F03D 7/0252 244/113 |
| 6,073,881 A | 6/2000 | Chen | |
| 6,565,045 B1 * | 5/2003 | Correge | B64C 3/14 244/215 |
| 8,052,388 B2 | 11/2011 | McCaffrey | |
| 8,777,580 B2 | 7/2014 | Eisenberg | |
| 9,815,547 B2 * | 11/2017 | Saliveros | B64C 9/06 |
| 2001/0019088 A1 * | 9/2001 | Smith | B64C 33/02 244/17.13 |
| 2005/0199832 A1 * | 9/2005 | Twerdochlib | F01D 5/005 250/559.29 |
| 2006/0202083 A1 | 9/2006 | Milde, Jr. | |
| 2011/0163205 A1 | 7/2011 | Shepshelovich | |
| 2012/0051936 A1 * | 3/2012 | Eisenberg | F03D 1/0633 416/235 |
| 2012/0068020 A1 | 3/2012 | Milde, Jr. | |
| 2012/0070283 A1 | 3/2012 | Westergaard | |
| 2012/0195764 A1 | 8/2012 | Fuglsang | |
| 2013/0121826 A1 | 5/2013 | Garver | |
| 2013/0142663 A1 | 6/2013 | Garver | |
| 2013/0259689 A1 | 10/2013 | Eisenberg | |
| 2014/0083216 A1 | 3/2014 | Brewer | |
| 2014/0255184 A1 | 9/2014 | Sutton | |
| 2014/0271212 A1 | 9/2014 | Brooks | |
| 2015/0204306 A1 | 7/2015 | Herr | |
| 2015/0211487 A1 | 7/2015 | Dixon | |
| 2017/0175705 A1 | 6/2017 | Garver | |
| 2020/0018333 A1 | 1/2020 | Webb | |

\* cited by examiner

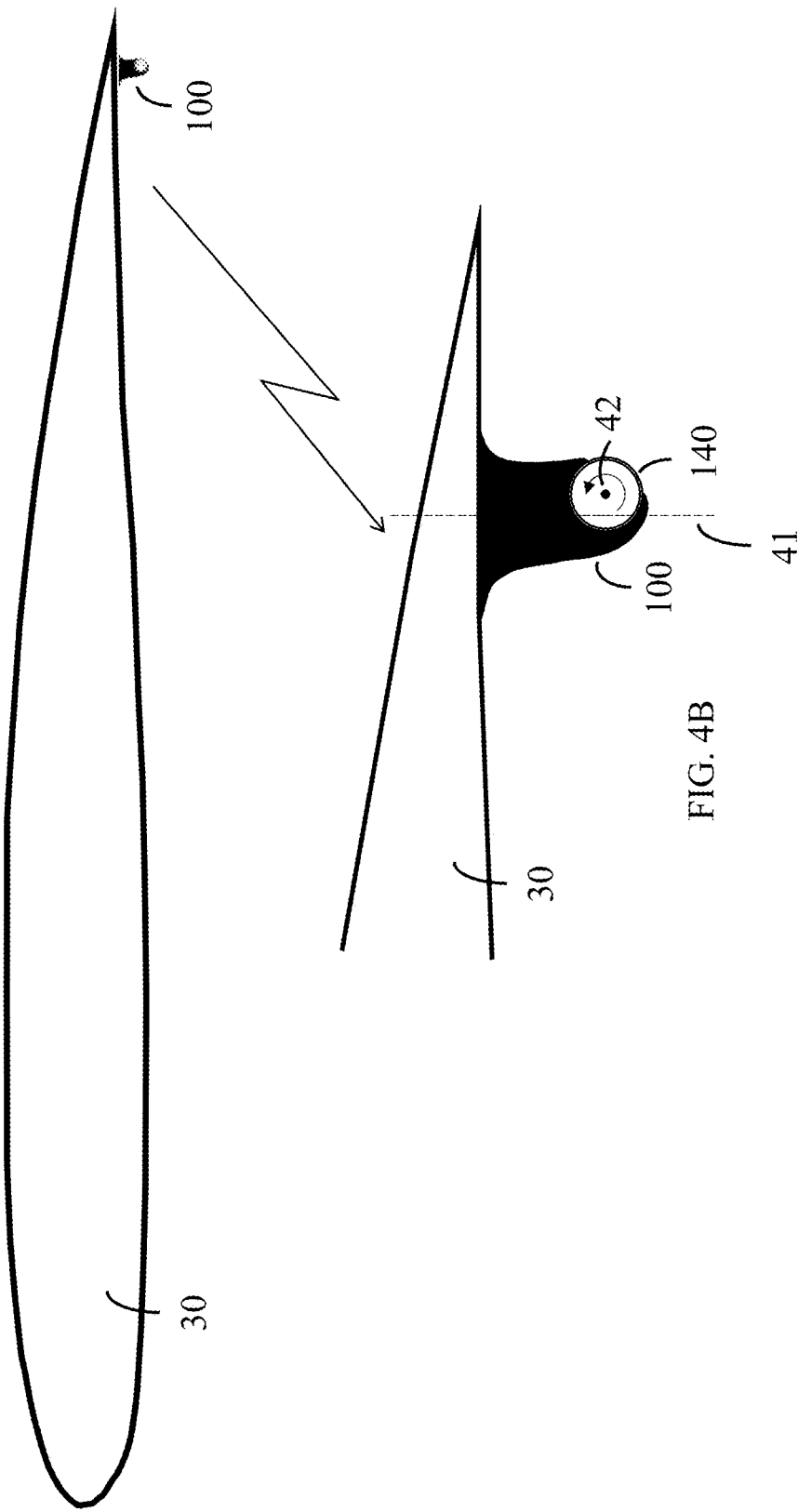

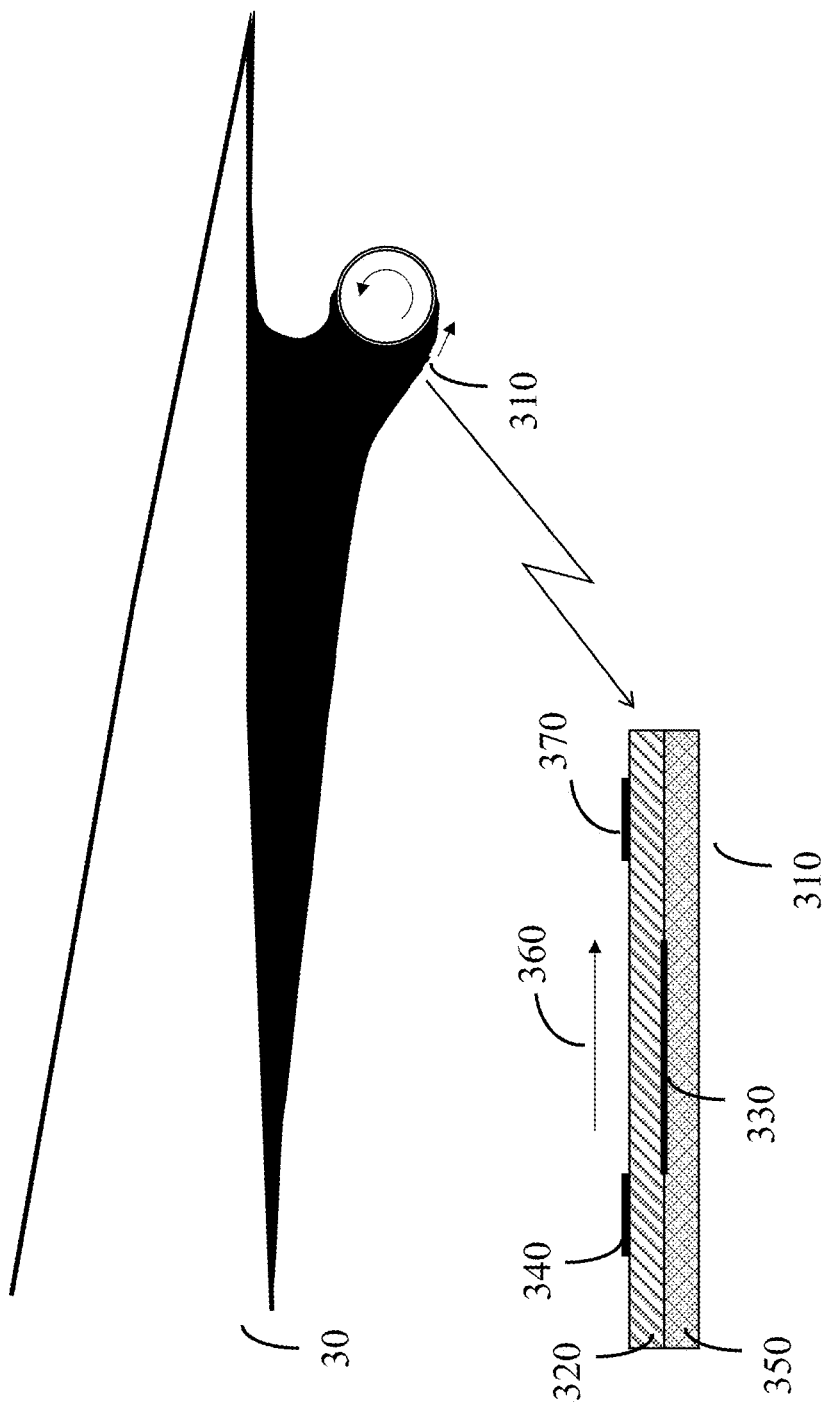

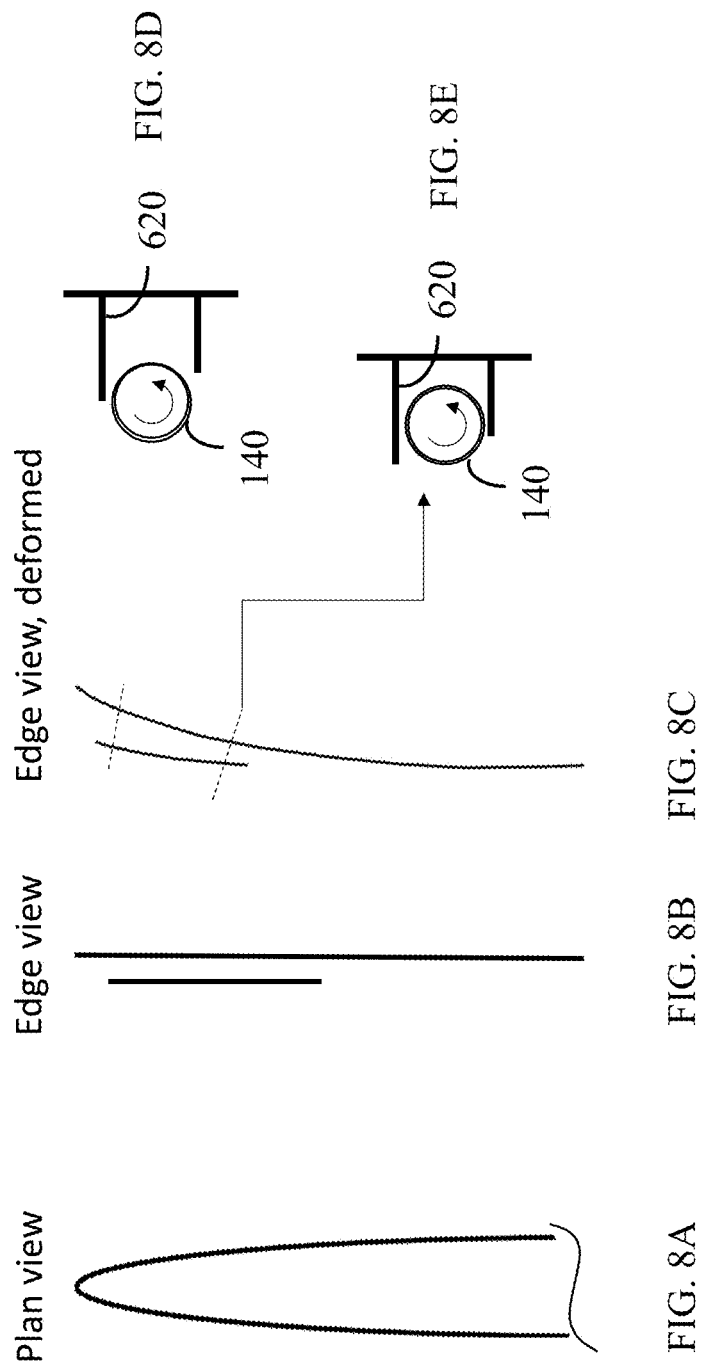

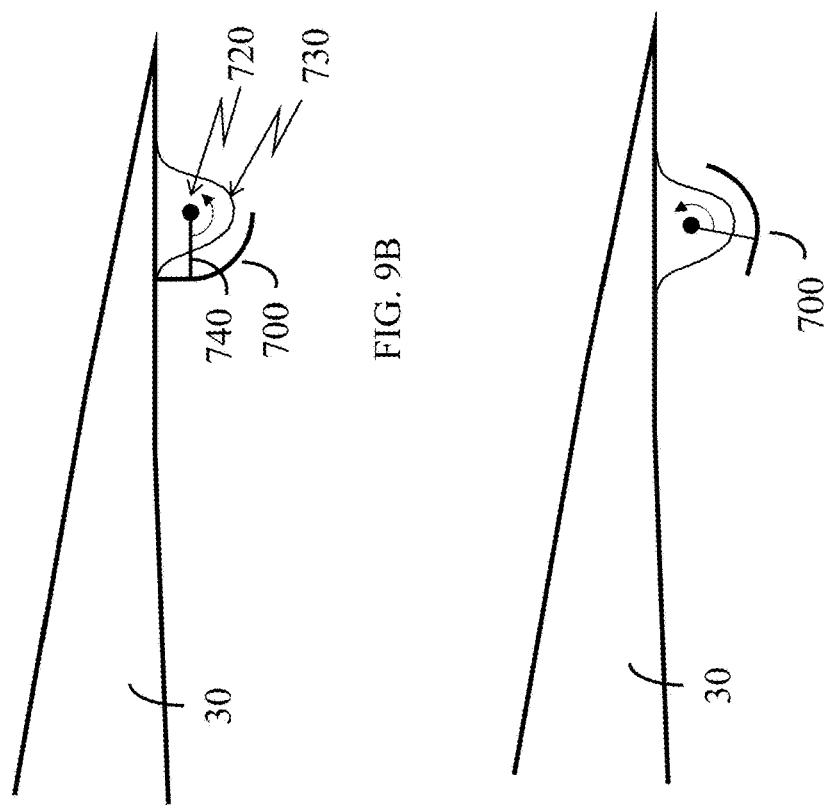
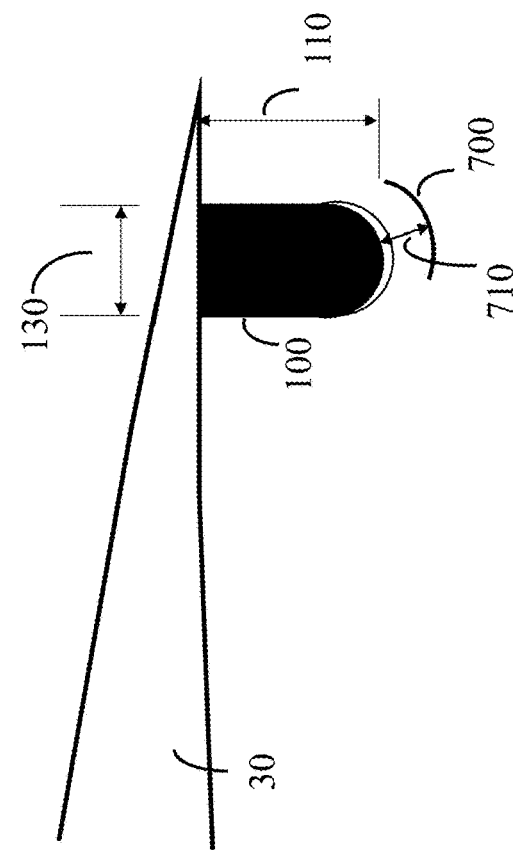

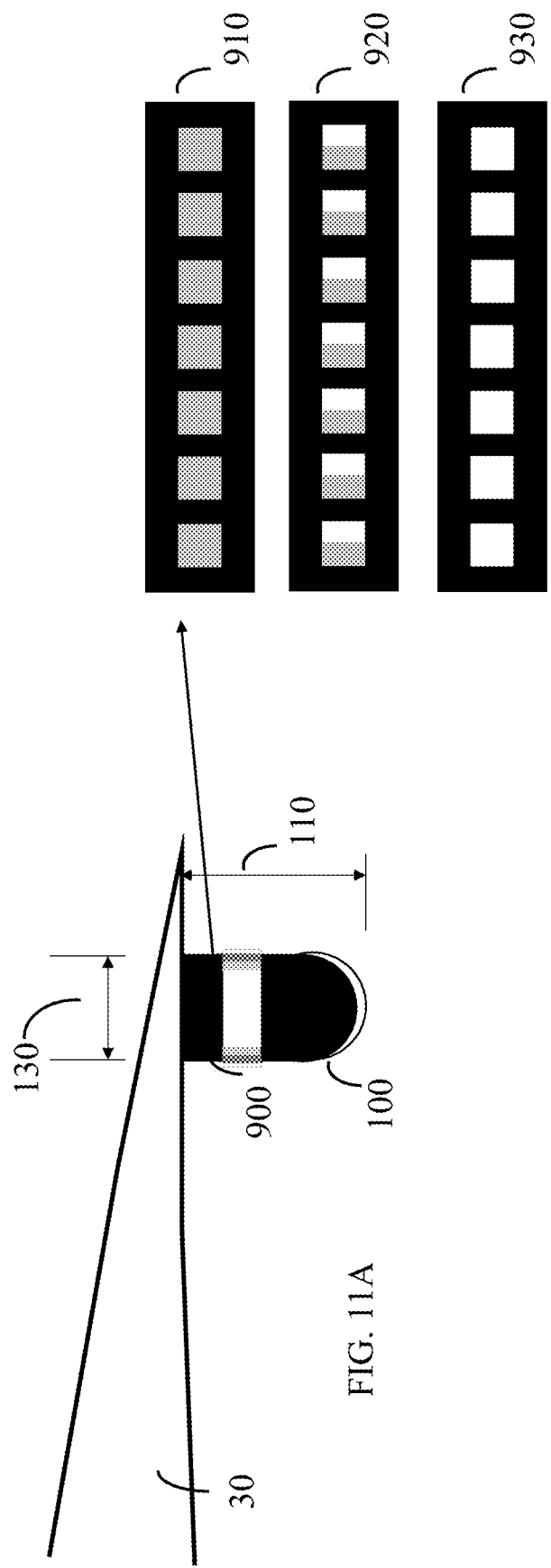

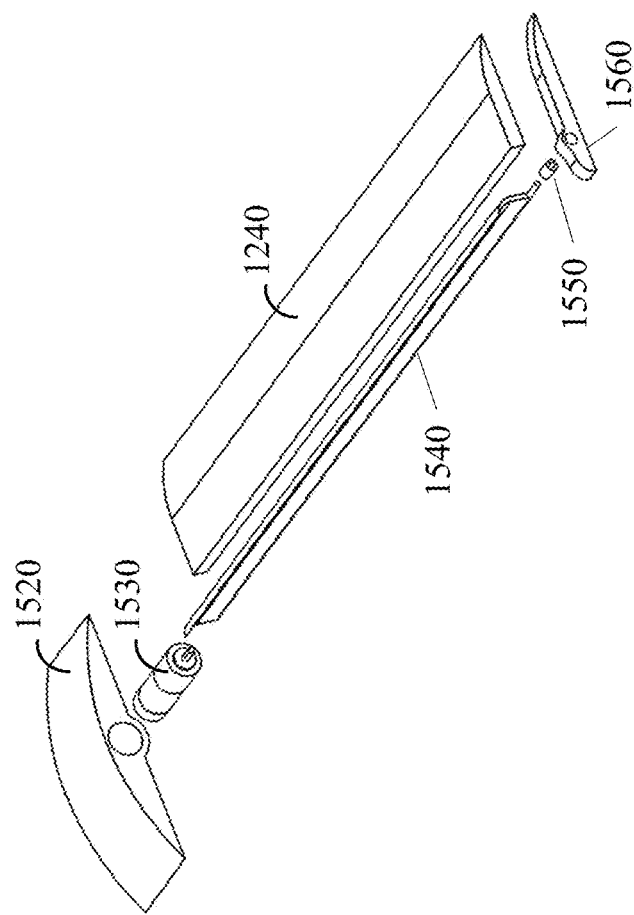
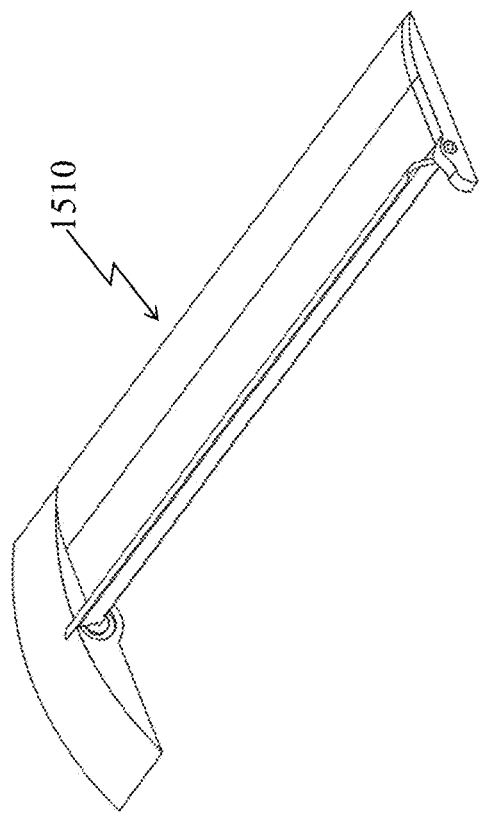
FIG.15B
FIG.15A

ACTIVE LIFT CONTROL DEVICE AND METHOD

RELATED APPLICATION

The present application is a divisional application of U.S. patent application Ser. No. 16/403,010, filed May 3, 2019 ("the parent application"), which claims the benefit of U.S. provisional application Ser. No. 62/666,472, filed May 3, 2018. Because the present application includes disclosure going beyond that of the parent application, the present application is also a continuation in part of the parent application. Each of the foregoing applications is hereby incorporated herein by reference in its entirety.

TECHNICAL FIELD

The present invention relates to devices for use in active control of the lift force generated by wings, airfoils, hydrofoils, rotating turbine blades, helicopter blades, propellers, and similar lifting bodies operating in an air or water stream.

BACKGROUND ART

Often, lifting surfaces experience unsteady forces caused by turbulence, gusts, wind shear, unsteady currents, upstream obstacles, and the like. Those unsteady forces lead to structural fatigue or catastrophic loads, and must be accounted for in system design. For example, to counter the anticipated occasional unsteady forces due to wind gusts, wind turbine components must be built strong and heavy, which makes them costly to build. Similarly, the cost and weight of materials used in the construction of airplane wings and fuselages is impacted by expected fatigue loads experienced by the wings and control surfaces.

In order to reduce the impact of unsteady forces, lifting surfaces may include active controls designed to modify the lift force in reaction to changes in the inflow velocity, in such a way as to minimize the fatigue loads experienced by the structure. One example is movable flaps, located either near the leading edge or the trailing edge of the blade. The flaps are controlled by a computer algorithm that is designed to minimize the undesirable fatigue load. In addition to movable flaps, there are other alternative active load control techniques, including boundary layer blowing or suction, synthetic jets, microtabs, and others.

Unfortunately, all of the active control techniques listed above are complex, and complexity leads to reliability problems, high capital cost, high energy cost, and safety issues. What is needed in the art is a simple and robust method of actively controlling the lift on lifting surfaces in response to changes in the inflow.

SUMMARY OF THE EMBODIMENTS

A Gurney flap is a passive device used to increase the lift generated by the flow over a lifting surface, such as a wing or wind turbine blade. A conventional Gurney flap consists of a simple rigid fence-like protuberance near the trailing edge of an airfoil. The device typically extends at right angles to the pressure side of the airfoil, and projects a distance equal to 1-3% of the wing's chord length into the flow. By producing a separated flow region just upstream and just downstream of the protuberance, the Gurney flap increases the pressure on the pressure side while keeping the boundary layer attached to suction side. This results in a significant increase in the lift in comparison to the airfoil without the Gurney flap.

Although embodiments of the present invention bear some resemblance to the Gurney flap, unlike the Gurney flap, embodiments of the present invention provide a lift device that can be actively controlled, so that either a baseline (or minimum) lift or a maximum lift, or an intermediate lift between those values, can be obtained on demand. For example, embodiments of the present invention can be used to reduce the unsteady forces experienced by wings and wind turbine blades by modifying the lift in response to wind gusts, turbulence, and the like. Such embodiments can be controlled by a computer algorithm that is designed to minimize the undesirable effects of the unsteady forces.

In one embodiment, the invention provides a lift control device for actively controlling lift of a lifting surface when the lift device is mounted to the lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the lift control device includes:

- a protuberance having a base and a tip and a length, the base configured to be mountable to the lifting surface near the trailing edge thereof, wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;
- a rotatable member having a central axis, rotatably mounted in the tip of the protuberance and occupying a majority of the length of the protuberance, the rotatable member mounted so that at least a circumferential portion of the rotatable member is exposed along a majority of its length directly to the fluid medium, so rotation of the rotatable member entrains fluid along its boundary layer so as to reduce the region of separated flow downstream of the protuberance and therefore to reduce lift produced by the lifting surface;
- a motor, mountable to the lifting surface and coupled to the rotatable member, the motor configured to produce angular rotation of the rotatable member about its central axis; and
- a controller, coupled to the motor, and configured to control rotation of the motor and therefore of the rotatable member, so that the controller controls lift of the lifting surface by controlling rotation of the rotatable member.

In a related embodiment, the rotatable member is cylindrical. Alternatively, the rotatable member is a frustum of a cone. Optionally, the rotating member is roughened. Also optionally, the rotating member is splined.

In another related embodiment, the device further includes a plasma actuator array mechanically coupled to a surface of the protuberance just upstream or downstream of the rotating member and coupled to the controller, so that the controller controls the plasma actuator array to control flow over the array so as to control lift of the lifting surface.

In various embodiments, the lifting surface is a blade of a wind turbine; or is selected from the group consisting of a wing of an airplane and a rotating blade of a rotorcraft; or is selected from the group consisting of a foil of a hydrofoil and a blade of a marine propeller.

In another embodiment, the invention provides a lift control device for statically controlling lift of a lifting surface when the lift device is mounted to the lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the lift control device includes:

- a protuberance having a base and a tip and a length, the base configured to be mountable to the lifting surface near the trailing edge thereof, wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;
- a rotatable member having a central axis, rotatably mounted in the tip of the protuberance and occupying a majority of the length of the protuberance, the rotatable member having mechanical stiffness slightly greater than that of the lifting surface, the rotatable member mounted so bending of the lifting surface causes at least a circumferential portion of the rotatable member to be exposed along a majority of its length directly to the fluid medium, so rotation of the rotatable member entrains fluid along its boundary layer so as to reduce the region of separated flow downstream of the protuberance and therefore to reduce lift produced by the lifting surface; and
- a fence, mountable to the lifting surface upstream of the rotatable member, with mechanical stiffness matching that of the blade.

Optionally, the rotatable member is cylindrical. Alternatively, the rotatable member is a frustum of a cone. In a related embodiment, the rotating member is roughened, Alternatively or in addition, the rotating member is splined. In another related embodiment, the lift control device further includes a plasma actuator array mechanically coupled to a surface of the protuberance just upstream or downstream of the rotating member, or on the surface of the rotating member, and coupled to a controller, such controller configured to control the plasma actuator array to control flow over the array so as to control lift of the lifting surface.

In a related embodiment, the lifting surface is a blade of a wind turbine. In another related embodiment, the lifting surface is selected from the group consisting of a wing of an airplane and a rotating blade of a rotorcraft. In yet another related embodiment, the lifting surface is selected from the group consisting of a foil of a hydrofoil and a blade of a marine propeller.

In another embodiment, the invention provides a lift control device for actively controlling lift of a lifting surface when the lift device is mounted to the lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the lift control device includes:

- a protuberance having a base and a tip and a length, the base configured to be mountable to the lifting surface near the trailing edge thereof, wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;
- a translatable member, mounted in the tip of the protuberance and occupying a majority of the length of the protuberance, the translatable member mounted so that at least a circumferential portion of the translatable member is exposed along a majority of its length directly to the fluid medium, so translation of the translatable member entrains fluid along its boundary layer so as to reduce the region of separated flow downstream of the protuberance and therefore to reduce lift produced by the lifting surface;
- a motor, mountable to the lifting surface and coupled to the translatable member, the motor configured to produce extension and retraction of the translatable member relative to the tip of the protuberance; and
- a controller, coupled to the motor, and configured to control rotation of the motor and therefore of the position of the translatable member, so that the controller controls lift of the lifting surface by controlling position of the translatable member.

In a related embodiment, the lifting surface is a blade of a wind turbine. In another related embodiment, the lifting surface is selected from the group consisting of a wing of an airplane and a rotating blade of a rotorcraft. In yet another related embodiment, the lifting surface is selected from the group consisting of a foil of a hydrofoil and a blade of a marine propeller.

In another embodiment, the invention provides a lift control device for actively controlling lift of a lifting surface when the lift control device is mounted to the lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the lift control device includes:

- a protuberance having a base and a tip and a length, the base configured to be mountable to the lifting surface near the trailing edge thereof, wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;
- a translatable or rotatable member, mounted in the interior of the protuberance and occupying a majority of the length of the protuberance, the translatable or rotatable member mounted so that translation or rotation of the member entrains fluid in a channel or array of channels through which fluid passes so as to reduce the region of separated flow downstream of the protuberance and therefore to reduce lift produced by the lifting surface;
- a motor, mountable to the lifting surface and coupled to the translatable or rotatable member, the motor configured to produce translation or rotation of the member; and
- a controller, coupled to the motor, and configured to control rotation of the motor and therefore of the position of the translatable or rotatable member, so that the controller controls lift of the lifting surface by controlling position of the translatable or rotatable member.

In a related embodiment, the lifting surface is a blade of a wind turbine. In another related embodiment, the lifting surface is selected from the group consisting of a wing of an airplane and a rotating blade of a rotorcraft. In yet another related embodiment, the lifting surface is selected from the group consisting of a foil of a hydrofoil and a blade of a marine propeller.

In another embodiment, the invention provides a method for controlling the lift generated by a lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the method includes:

mounting, to the lifting surface, near the trailing edge thereof, a protuberance having a base and a tip and a length, in a manner wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;

rotatably mounting a rotatable member having a central axis in the tip of the protuberance and occupying a majority of the length of the protuberance, the rotatable member mounted so that at least a circumferential portion of the rotatable member is exposed along a majority of its length directly to the fluid medium, so rotation of the rotatable member entrains fluid along its boundary layer so as to reduce the region of separated flow downstream of the protuberance and therefore to reduce lift produced by the lifting surface; and controlling rotation of the rotatable member so as to control lift of the lifting surface.

In another embodiment, the invention provides a method for controlling the lift generated by a lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the method incudes:

mounting, to the lifting surface, near the trailing edge thereof, a protuberance having a base and a tip and a length, in a manner wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;

translatably mounting a translatable member located in the tip of the protuberance and occupying a majority of the length of the protuberance, the translatable member mounted so that at least a circumferential portion of the translatable member is exposed along a majority of its length directly to the fluid medium, so translation of the translatable member entrains fluid along its boundary layer so as to reduce the region of separated flow downstream of the protuberance and therefore to reduce lift produced by the lifting surface; and controlling rotation of the translatable member so as to control lift of the lifting surface.

In yet another embodiment, the invention provides a method for controlling the lift generated by a lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length. In this embodiment, the method includes:

mounting, to the lifting surface, near the trailing edge thereof, a protuberance having a base and a tip and a length, in a manner wherein the length of the protuberance occupies a majority of the length of the trailing edge; the protuberance creating a region of separated flow downstream of the protuberance, such region having the effect of increasing lift produced by the lifting surface when the protuberance is mounted to the pressure surface of the lifting surface;

translatably or rotatably mounting a translatable or rotatable member, as the case may be, located inside the protuberance and occupying a majority of the length of the protuberance, the translatable or rotatable member mounted so that translation or rotation of the member entrains fluid in a channel or array of channels through which fluid passes so as to reduce the region of separated flow downstream of the protuberance and therefore to reduce lift produced by the lifting surface; and controlling rotation of the translatable member so as to control lift of the lifting surface.

In another embodiment, the invention provides a lift control device for actively controlling lift of a lifting surface when the lift control device is mounted to the lifting surface, the lifting surface being movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length and defining a longitudinal axis. In this embodiment, the lift control device includes:

a longitudinally disposed vane, the vane having a base and a length, the base configured to be mounted to the pressure surface, near the trailing edge of the lifting surface, via a set of hinges along the base, the set of hinges defining a pivot about which the vane is rotatable, the vane creating a region of separated flow downstream of the vane, such region having the effect of increasing lift produced by the lifting surface when the vane is at a non-zero angle with respect to the pressure surface;

a motor, mountable to the lifting surface and coupled to vane, the motor configured to adjust angular orientation of the vane about the pivot, the angular orientation controlling the extent of lift increase produced by the vane; and a controller, coupled to the motor, and configured to control rotation of the motor and therefore angular orientation of the vane about the pivot, so that the controller controls lift of the lifting surface by controlling angular orientation of the vane.

In a related embodiment, the device further includes a shaft encoder, coupled to the vane and to the controller, that provides to the controller a signal related to angular orientation of the vane about the pivot; and a control line, coupled to the motor, that provides an electrical signal related to torque being produced by the motor, the control line coupled to the controller. The controller is configured to use the electrical signal on the control line to determine a quantity related to wind speed experienced by the vane over the pressure surface and to use the determined quantity to control angular orientation of the vane, as measured via the shaft encoder, so as to adjust lift of the lifting surface in relation to the wind speed.

In another related embodiment, the device further includes a set of fairings mountable to the lifting surface with respect to the vane so as to smooth flow over the vane.

In a further related embodiment, the vane includes a plurality of discrete, overlapping elements. Alternatively, or in addition, the length of the vane occupies a majority of the length of the trailing edge.

BRIEF DESCRIPTION OF THE DRAWINGS

The foregoing features of embodiments will be more readily understood by reference to the following detailed description, taken with reference to the accompanying drawings, in which:

FIG. 4A is a two-dimensional cross-sectional view of a lifting surface with a second embodiment of the controllable lift device of the present invention. FIG. 4B provides detail in the vicinity of the protuberance 100 of FIG. 4A.

FIG. 6A is a two-dimensional cross-sectional view of a lifting surface with the combination of the controllable lift device and a plasma actuator in accordance with an embodiment of the present invention. FIG. 6B provides detail in the vicinity of dielectric barrier discharge plasma actuators 310 of FIG. 6A.

FIGS. 8A and 8B are a plan view and an edge view of a planar lifting surface with a semi-active embodiment of the controllable lift device in accordance with an embodiment of the present invention. FIG. 8C provides a further edge view when the lifting surface is deformed as a result of wind, so as to cause a change in the normal position of the rotating cylinder 140 shown in FIG. 8D to an exposed position shown in FIG. 8E in which the rotating cylinder is exposed to flow.

FIGS. 9A, 9B, and 9C are two-dimensional cross-sectional views of a lifting surface with a fourth embodiment of the controllable lift device of the present invention.

FIG. 11A is a two-dimensional cross-sectional view of a lifting surface in a sixth embodiment of the controllable lift device of the present invention, and FIG. 11B illustrates successive positions of a sliding fence used in the embodiment of FIG. 11A.

FIGS. 15A and 15B are isometric drawings of the embodiment of the present invention represented by FIGS. 12C and 12D.

DETAILED DESCRIPTION OF SPECIFIC EMBODIMENTS

Definitions. As used in this description and the accompanying claims, the following terms shall have the meanings indicated, unless the context otherwise requires:

An "active lift control" device or system is one which takes an input signal from a computer processor and uses that signal to change the state of an actuator, so as to modify the lift force on a lifting surface.

An "actuator" is a mechanical or electrical device that can be used to modify the lift force on a lifting surface.

An "array" of items includes at least one of the items.

A "lift force" is the force experienced by a lifting surface, resulting from flow around that lifting surface, oriented at right angles to the velocity of the fluid medium just upstream of the lifting surface.

A "passive lift control" device is one which modifies the lift force on a lifting surface without any active control from a computer processor. Passive changes in lift occur naturally based on the mechanical design of the device or system in reaction to changes in inflow, position of lifting surface, or other relevant parameter.

The "chord length" of a lifting surface, having a leading edge and a trailing edge along a span defining a longitudinal axis of the lifting surface, is the length of an imaginary straight line, normal to the longitudinal axis, from the leading edge to the trailing edge.

The "angle of attack" of a lifting surface is the angle subtended between the imaginary line from the leading edge to the trailing edge, as defined above in relation to the chord length, and the mean direction of the incoming flow upstream of the lifting surface.

Figure 1:
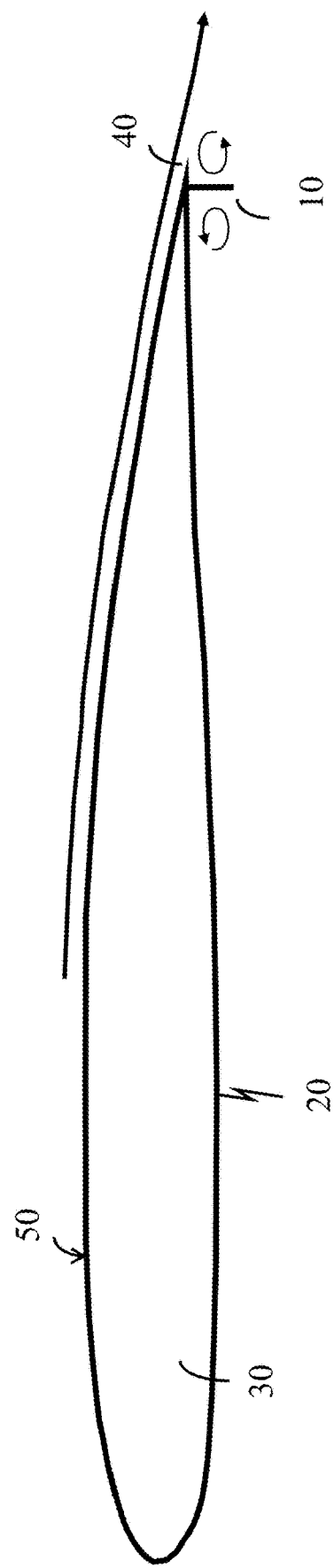
FIG. 1 shows a two-dimensional cross-sectional view of a lifting surface with a traditional prior art (non-controllable) Gurney flap.

FIG. 1 shows a two-dimensional cross-sectional view of a lifting surface with a traditional prior art (non-controllable) Gurney flap. In this figure and all figures of a lifting surface below, the flow over the lifting surface starts at the left and proceeds to the right. Similarly, in all figures of the lifting surface herein, span of the lifting surface, which defines its longitudinal axis, is perpendicular to the page. Referring to FIG. 1, a conventional prior art Gurney flap 10 is a small fence-like structure that projects from the pressure side 20, near the trailing edge 40, of a lifting surface 30. For convenience of illustration, the size of the Gurney flap is exaggerated in relation to that of the lifting surface 30. In some circumstances, the Gurney flap can instead project from the suction side 50 near the trailing edge 40. When used on the pressure side, the Gurney flap can significantly increase the lift force on the lifting surface. When used on the suction side, the Gurney flap can significantly decrease the lift force (or generate a negative lift force).

Figures 2A, 2B:
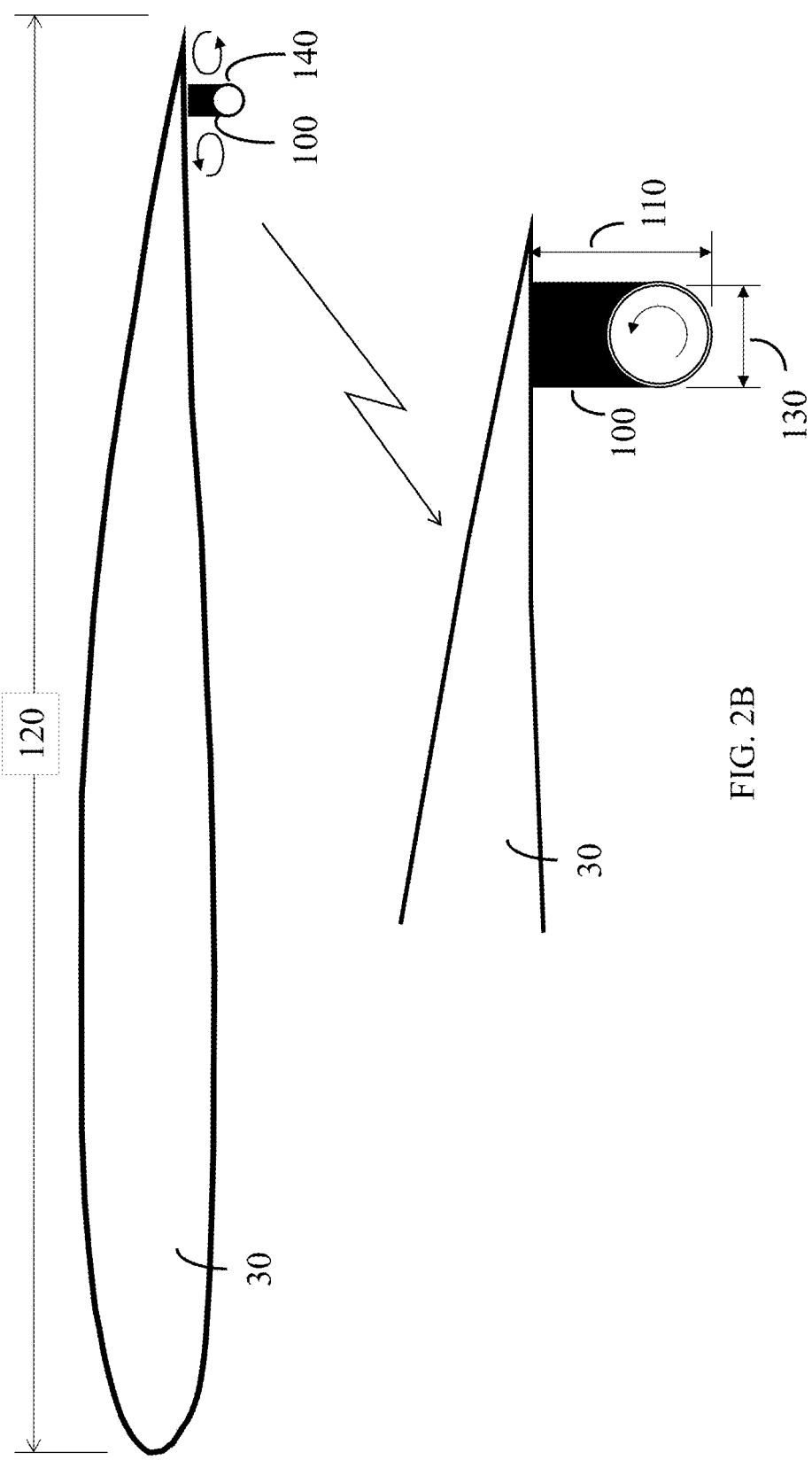
FIG. 2A is a two-dimensional cross-sectional view of a lifting surface with one embodiment of the controllable lift device of the present invention.
FIG. 2B provides detail in the vicinity of the protuberance 100 of FIG. 2A.

FIG. 2A shows one embodiment of the active lift control device of the present invention. In this embodiment, the device includes a protuberance 100 projecting from the pressure side of lifting surface 30 and oriented parallel to the longitudinal axis of the lifting surface (which, as discussed above in connection with FIG. 1, is perpendicular to the page. FIG. 2B provides detail in the vicinity of the protuberance 100 of FIG. 2A. The lifting surface is operative in a fluid medium, such as air, in which case it is an airfoil, which may be deployed, for example, as a wing or a propeller blade, or water, in which case it may be deployed, for example, in a marine propeller or in a foil of a hydrofoil. The lifting surface is movable relative to the fluid medium so as to define a leading edge 21 and a trailing edge 22, the lifting surface also having a pressure surface 23 thereof and a vacuum surface 24 thereof. The leading edge and the trailing edge run along the span of the lifting surface. (Again, for convenience of illustration, in this and subsequent figures, the size of the device is exaggerated in relation to the size of the lifting surface 30.) The height 110 of the protuberance is between 0.1% and 20% of the airfoil's chord length 120, with a preferred height ranging between about 1% and about 2% of the chord length. In this embodiment, the aspect ratio, defined here as the ratio of the height of the protuberance 110 to its width 130, is between about 0.5 and 5.0, with a preferred aspect ratio of about 2.0. At the outermost extent of the height 110 of the protuberance is mounted a hollow rotatable member 140, which may be cylindrical and is mounted in a manner leaving it free to rotate about its central axis. Additionally, the rotatable member is mounted so that at least a circumferential portion of the rotatable member is exposed along a majority of its length directly to the fluid medium. By rotating the cylinder in the direction shown in FIG. 2A, the boundary layer is caused to remain attached to the surface of the cylinder. This rotation reduces the separated flow region downstream of the control device, closely approximating the baseline flow conditions which would occur without the presence of the control device.

Figure 3:
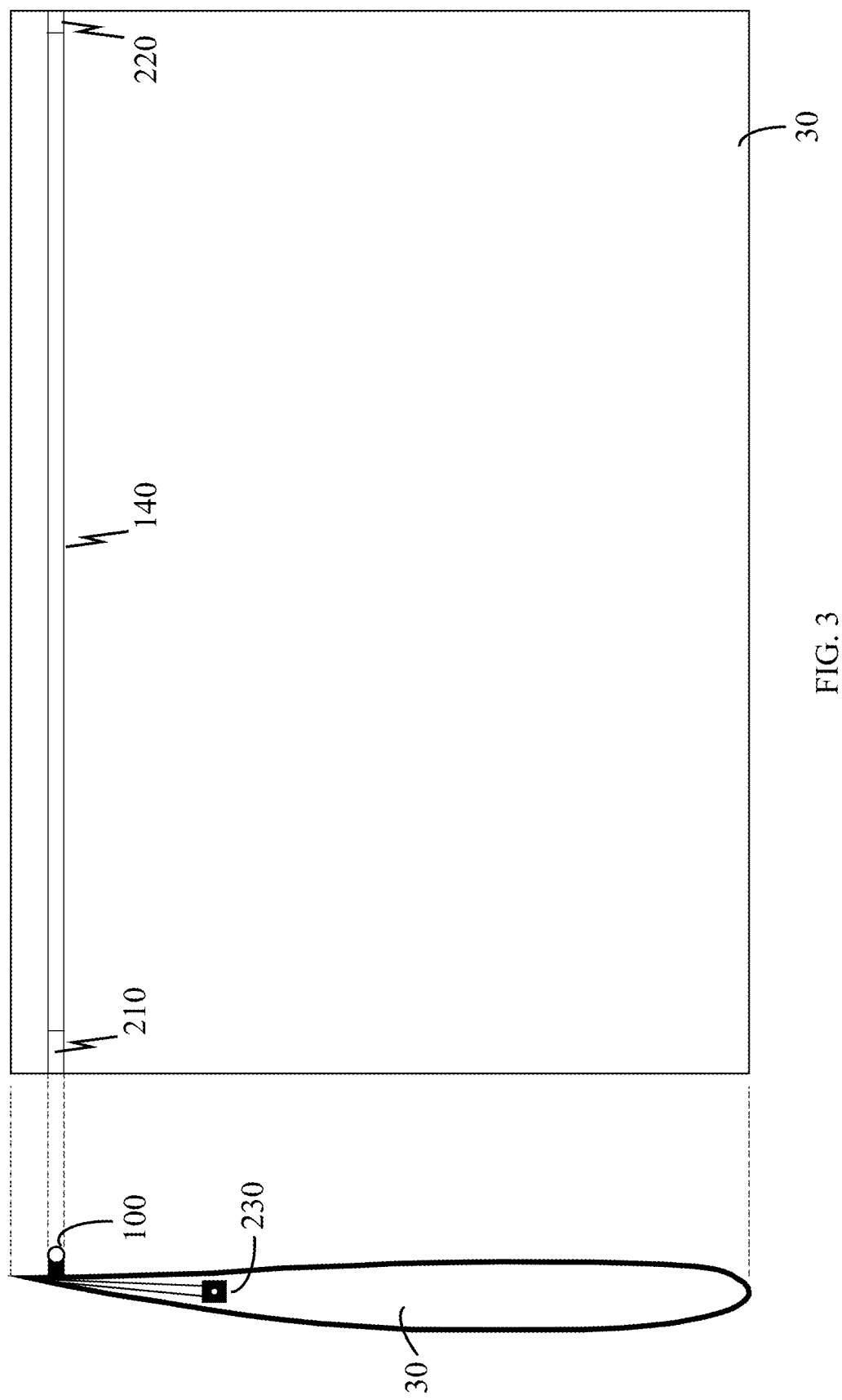
FIG. 3 is a plan view integrated with a cross-sectional view of the lifting surface with the controllable lift device of FIG. 2.

FIG. 3 shows a plan view integrated with a cross-sectional view of the lifting surface 30 with the controllable lift device of FIG. 2. In some low speed flows (which require only a small motor to turn the cylinder), or in cases where a large control device is used, the shaft is driven by a motor housed inside chamber 210 at one end of the shaft. Shaft bearing 220 is located at the other end of the shaft. However, in some cases of interest, chamber 210 has insufficient volume to house the motor. In those cases, cylinder 140 is driven by motor 230 mounted inside the airfoil 30, as shown in FIG. 3. The rotational rate of the shaft is determined by a computer controller (not shown). The upper limit of the rotational rate will be proportional to the magnitude of the air speed upstream of the airfoil. The ratio of the surface speed of the cylinder ($U_c$, defined as the rotational frequency in radians per second times the radius in meters) to the incoming flow speed (U, in meters per second) is between about 1 and about 3. Rotating the cylinder at that rate will cause the flow to remain attached to the surface, negating or partially negating the increased lift due to the device.

For use on rotating blades, such as the blades of helicopters or wind turbines, for example, the relative speed of the flow over the lifting surface increases in proportion to the distance from the axis of rotation. As a result, the surface speed of the cylinder, $U_c$, must also increase in proportion to the distance from the axis of rotation of the rotating blades. To accomplish that using a stiff cylinder, it may be desirable to increase the diameter of the cylinder in proportion to the same distance. In this case, the cylinder is replaced by a frustum of cone with its base (where the diameter of the rotating member is at a maximum) at the outer span towards the tip of the rotating blade, and tip of the frustum (where the diameter of the rotating member is at a minimum) at the inner span towards the hub of the rotating blade.

FIG. 4A shows a two-dimensional cross-sectional view of a lifting surface with a second embodiment of the lift control device of the present invention. FIG. 4B provides detail in the vicinity of the protuberance 100 of FIG. 4A. In this embodiment, the top of protuberance 100 is rounded, and the center 41 of the rotating cylinder 140 is displaced downstream relative to a centerline 42 of the protuberance.

Figures 5A, 5B:
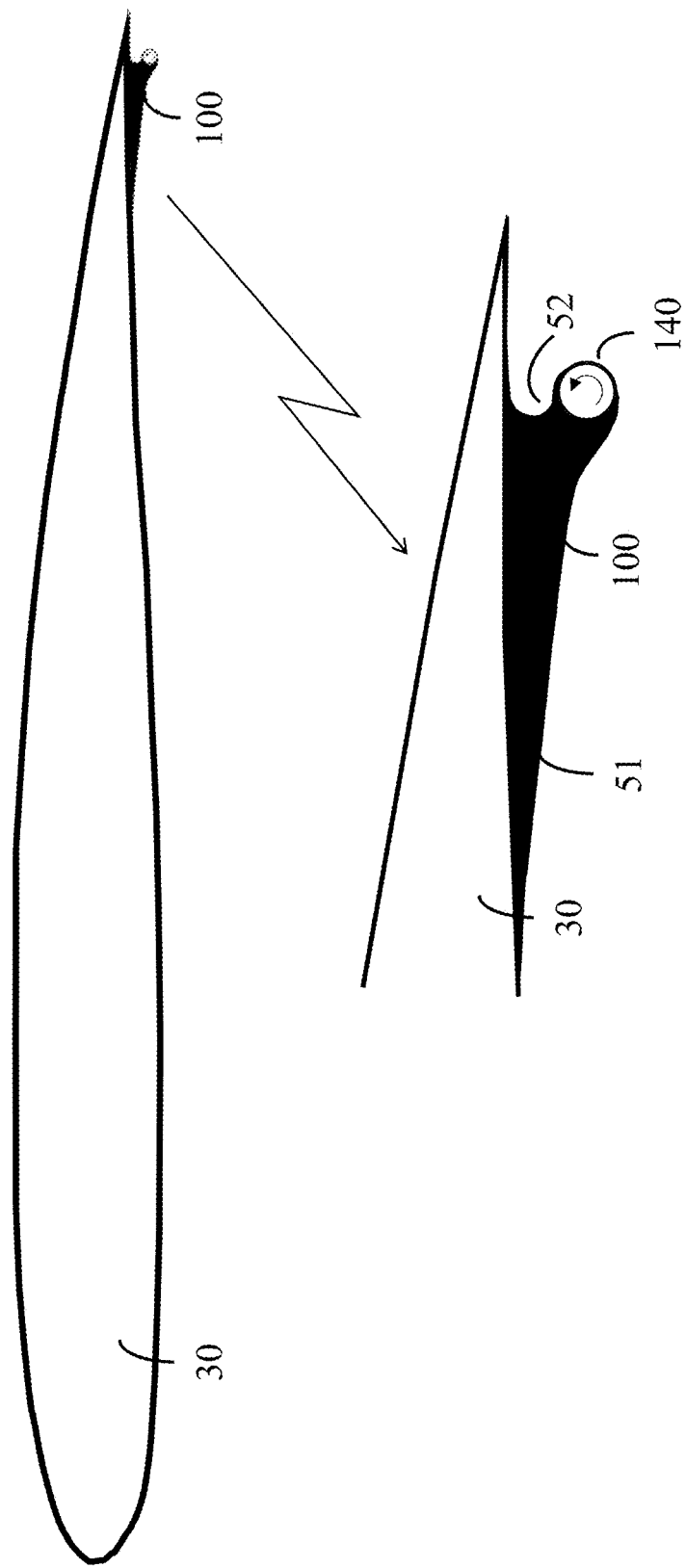
FIG. 5A is a two-dimensional cross-sectional view of a lifting surface with a third embodiment of the controllable lift device of the present invention.
FIG. 5B provides detail in the vicinity of the protuberance 100 of FIG. 5A.

FIG. 5A shows a two-dimensional cross-sectional view of a lifting surface with a third embodiment of the lift control device of the present invention. FIG. 5B provides detail in the vicinity of the protuberance 100 of FIG. 5A. In this embodiment, the leading edge of protuberance 100 is faired into the surface of the airfoil, with a smoothly varying leading-edge region 51 followed by a more rapidly varying downstream shape 52. This embodiment is intended to reduce the parasitic form drag associated with the active flow control device. The rotating cylinder 140 is placed on the downstream side of the protuberance, as shown in the Figure.

In all embodiments, the cylinder may have a smooth surface, or may be roughened using standard roughness parameters (as defined, for example, in the ISO 4287: 1997 standard). Alternatively, the cylinder may be grooved or splined, or provided with another surface shape that increases the surface-entrainment of the fluid. In one embodiment, the cylinder includes splines aligned parallel to the cylinder axis, the splines projecting radially by between about 0.1% and 1% of the cylinder radius. The cylinder includes between about 10 and 100 splines on its surface.

In some circumstances, it may be beneficial to add to the device a second form of active flow control either just upstream, just downstream, or both upstream and downstream, of the rotating cylinder. Examples of other flow control techniques include boundary layer blowing, boundary layer suction, synthetic jets, or plasma actuators.

FIG. 6 is a two-dimensional cross-sectional view of a lifting surface with the combination of a lift control device and a plasma actuator in accordance with an embodiment of the present invention. In this embodiment, when the working fluid is air, dielectric barrier discharge plasma actuators 310 are placed on the surface of the protuberance just upstream and just downstream of the rotating cylinder. FIG. 6B provides detail in the vicinity of dielectric barrier discharge plasma actuators 310 of FIG. 6A. The plasma actuators consist of a thin layer of dielectric material 320, a covered electrode 330, an exposed electrode 340, and substrate 350. The plasma actuators can be driven by an AC power supply or a pulsed-DC power supply (not shown). The actuators can be oriented such that they impart a force 360 on the fluid largely in line with the local flow and tangential to the surface, or opposing the local flow, or with components in both tangential directions. The actuator may optionally include a second exposed electrode 370 on the surface of the dielectric. The third electrode may be powered by a second power supply (not shown) to provide a bias voltage intended to increase the force on the fluid.

Figure 7:
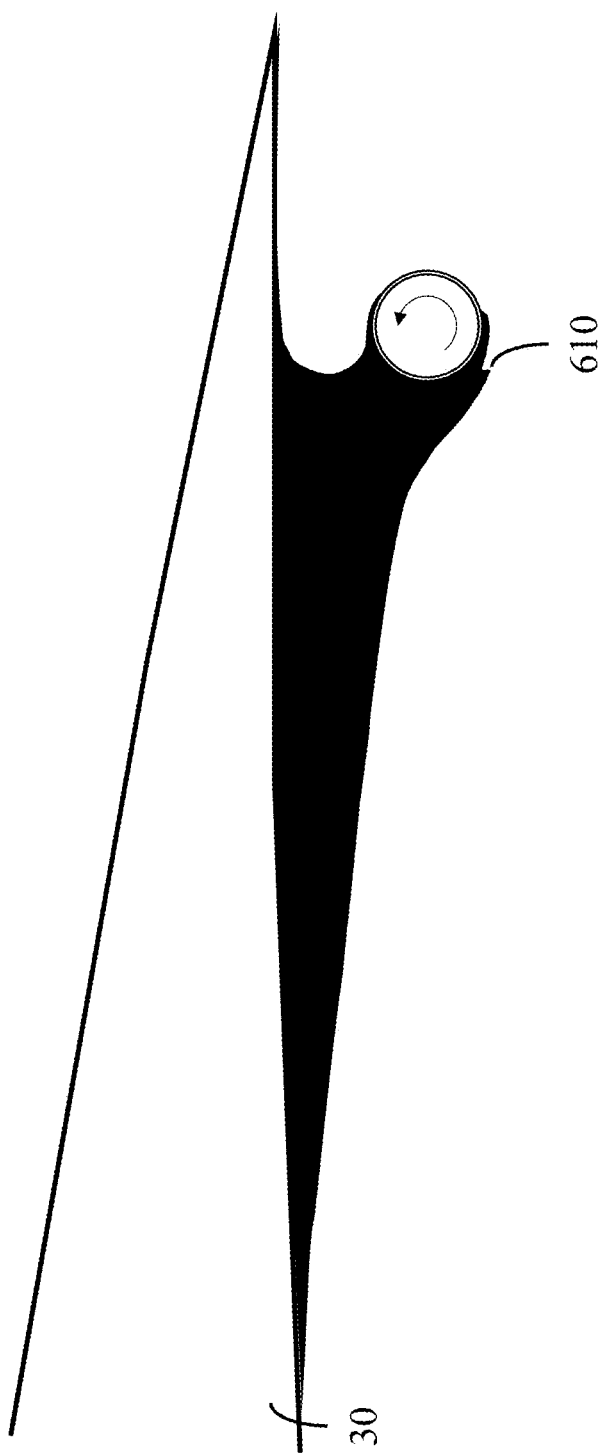
FIG. 7 is a two-dimensional cross-sectional view of a lifting surface with the combination of the controllable lift device and a backward facing step in accordance with an embodiment of the present invention.

In some situations, it may be desirable to drive the cylinder at a fixed rate continuously, even in circumstances when the computer controller might, from time to time, call for separated flow (e.g., high lift). For example, in situations where it is important to react quickly to changes in the inflow (as is often the case when mitigating fatigue loads on wind turbine blades, for example), the time it takes to start and stop the cylinder rotation may be prohibitively long or require excessively large torque. In those situations, the second active flow control device can be used to induce separation upstream of the cylinder. While the rotating cylinder is capable of delaying separation, it generally will not cause separated flow to reattach when the separation point is upstream of the cylinder. One embodiment of this approach is shown in FIG. 7, which shows a two-dimensional cross-sectional view of a lifting surface with the combination of the controllable lift device and a backward facing step in accordance with an embodiment of the present invention. In this embodiment, a backward-facing step 610 is located near the tip of the control device. The step 610 normally causes an adverse pressure gradient to develop due to the steep geometry slope. In the embodiment of FIG. 7, a plasma actuator of the general type illustrated in FIGS. 6A and 6B, 7, 8A, 8B, 8C, and 8D, is also provided, and the plasma actuator is activated when it is desired to maintain attached flow beyond the step (e.g., when the controller calls for the low lift condition). The plasma actuator is then deactivated when high lift is called for. Since the flow reacts to the plasma actuator very quickly (generally within 10-100 milliseconds), the actuator can provide rapid variation in, and therefore rapid control of, lift.

In other situations, the rotating cylinder may only partially reattach the flow around the device. For example, the required rotational rate may be excessively high for achieving full lift degradation. To address such a situation, the surface of the rotating cylinder may be configured with an array of plasma actuators; activation of this array causes further attachment of the flow and further degradation of the lift on the wing. As in the embodiments described above in connection with FIGS. 6A, 6B, 7, 8A, 8B, 8C, and 8D, the fast-reacting plasma actuators of this embodiment can produce rapid changes in lift. The activation of the plasma actuators is synchronized with angular position of the rotating cylinder so that the actuators are powered in the same angular position for every cycle.

In other situations, it may be desirable to operate the lift control device in a semi-active mode. For example, to control bending of wings and wind turbine blades in response to increasing wind speed, the device can be configured to reduce the local lift force when bending is caused by excessive lift associated with a sudden increase in wind speed. The bending control can be accomplished by making the bending stiffness of the cylinder 140 slightly higher than the bending stiffness of the airfoil 130. This approach is illustrated in FIGS. 8A, 8B, 8C, and 8D, which show a plan view and an edge view of a planar lifting surface with a semi-active embodiment of the controllable lift device in accordance with an embodiment of the present invention. In the natural unbent state, the rotating cylinder 140 is shielded by the upstream fence 620, so that the control device acts like a traditional Gurney flap in increasing the lift relative to the baseline lifting surface without the device. When the lifting surface bends away from the wind, the differential stiffness causes the rotating cylinder to be exposed to the flow, causing the flow to reattach and negating or partially negating the passive lift increase associated with the control device.

FIG. 9 shows a fourth embodiment in which a small flap or slat 700 is mechanically deployed from the outer surface of a lift control device in accordance with the present invention. In this embodiment, a portion of the air or water stream is forced to flow directly behind the protuberance, thereby reducing the separated flow region behind the protuberance. The lift on the wing decreases as the channel's width 710 is increased and more flow is diverted behind lift modifying device. The width of the channel varies between 1% and 20% of the width 130 of the controllable lift device. The channel starts slightly upstream relative to the centerline 42 of the protuberance and continues approximately to the end of the rounded section. Alternatively, referring to the embodiment depicted in FIG. 9b, slat 700 nominally forms the leading edge of controllable lift device 100. Slat 700 is mechanically connected to rotatable axis 720 via connector 740. When rotated, slat 700 forms a flow-diverting channel that reduces the separated flow region behind the protuberance, decreasing the lift on the wing as flow is diverted behind the lift modifying device. Slat 700 can be curved, as shown in FIG. 9B, or flat. Protuberance 730 houses a solenoidal or pneumatic rotary actuator which provides the required torque to rotate connector 740 and slat 700. Slat 700 is continuous over a particular span, with periodic connections to rotary actuators mounted inside independent protuberances 730.

Figure 10A:
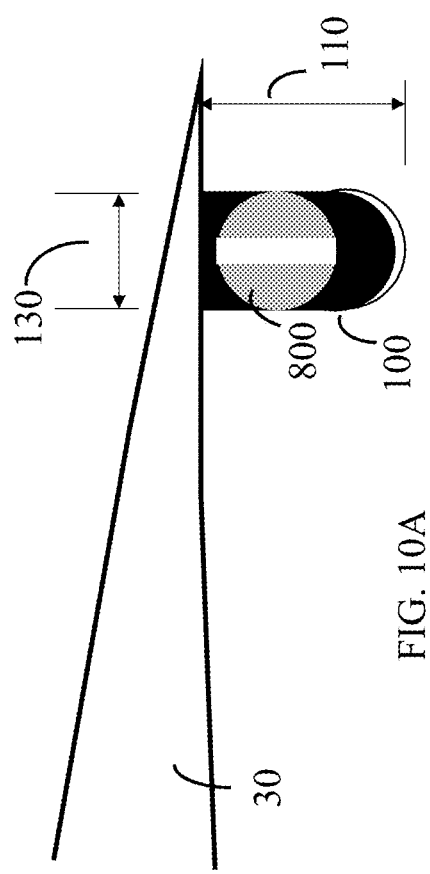
FIGS. 10A and 10B are two-dimensional cross-sectional views of a lifting surface in a fifth embodiment of the controllable lift device of the present invention.
Figure 10B:
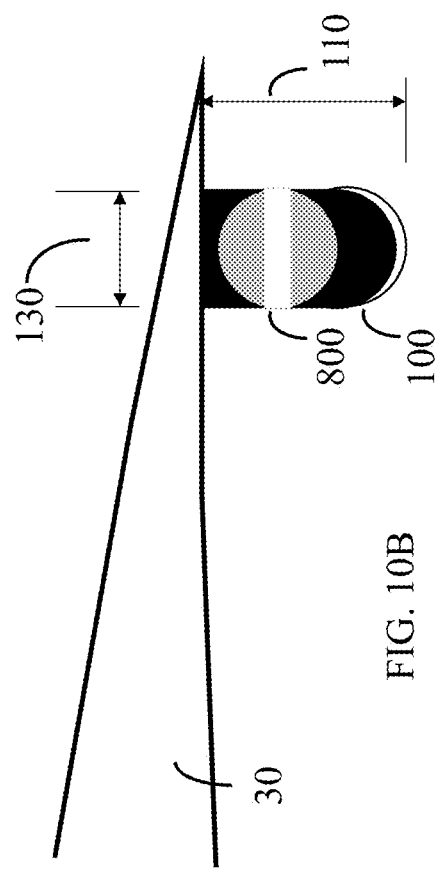

FIGS. 10A and 10B are two-dimensional cross-sectional views of a lifting surface in a fifth embodiment of the lift control device of the present invention. In this embodiment, the permeability of the device provides lift control. The controllable lift device achieves its effect in part by creating a high-pressure region behind the flap. Allowing some of the air or water stream to pass through protuberance 100 decreases this effect and therefore decreases the lift on lifting surface 30. In this embodiment, a rotating element 800 is used to provide a path 810 for the air or water to pass through protuberance 100. Rotating element 800 such that channel 810 does not provide a path for air or water to flow through protuberance 100 (as depicted in FIG. 10A) results in the maximum lift on lifting surface 30. Rotating element 800 such that channel 800 does provide a patch for air or water to flow through protuberance 100 (as depicted in FIG. 10B), results in the minimum lift on lifting surface 30. An intermediate lift between the maximum and minimum values is achieved the rotating element 800 provides a partial path for air or water to flow through protuberance 100. The maximum fraction of the frontal area that is opened by the rotating element 800 is between 25% and 70% with a preferred value of about 45%.

FIG. 11A is a two-dimensional cross-sectional view of a lifting surface in a sixth embodiment of a lift control device in accordance with the present invention, and FIG. 11B illustrates successive positions of a sliding fence used in the embodiment of FIG. 11A. This embodiment is similar to that described in the previous paragraph, but here sliding fence 900 (shown FIG. 11B) is used to open channels for the flow to pass through. As with the rotating element 800 of FIG. 10A, the maximum lift is achieved with the gates fully closed (as depicted in the top portion of FIG. 11B) and the minimum lift when they are fully open (as depicted in the bottom portion of FIG. 11B). An intermediate effect occurs for partially open gates (as depicted in the middle portion of FIG. 11B). The maximum fraction of the frontal area that is opened by the gates is between 25% and 70% with a preferred value of 45%.\

Figure 12A:
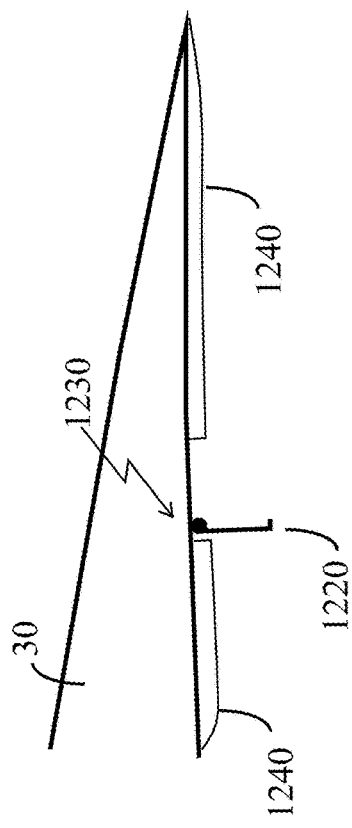
FIGS. 12A through 12D are two-dimensional cross-sectional views of a lifting surface showing a seventh embodiment of the controllable lift device of the present invention.
Figure 12B:
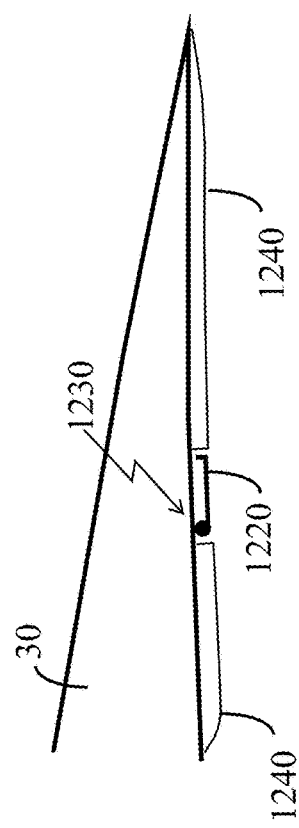

FIGS. 12A through 12D are two-dimensional cross-sectional views of a lifting surface in a seventh embodiment of a lift control device in accordance with the present invention. In FIGS. 12A and 12B, the lift control device includes a longitudinally disposed vane 1220 hingedly attached to segment 1210 for controllable movement about pivot 1230. The angle between segments 1210 and 1220 is fixed at about 90 degrees. The two segments rotate in unison about pivot 1230. In FIGS. 12A and 12B, the pivot 1230 of the hinge is mounted inside of the lifting surface. In FIG. 12A, the vane 1220 is disposed in a downward direction, so as to increase the lift in a manner analogous to that described in connection with FIG. 2A above. As shown in FIG. 12B, when low lift is commanded by the controller, the vane 1220 and segment 1210 are rotated counter-clockwise about pivot 1230, so that segment 1210 is hidden inside and vane 1220 is disposed flush to the body of lifting surface 30.

Figure 12C:
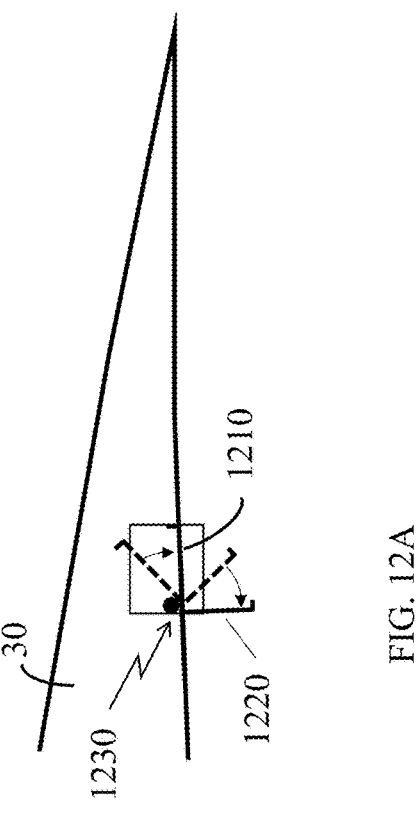
Figure 12D:
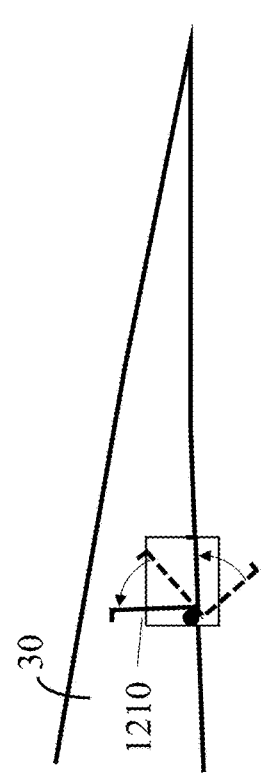

FIGS. 12C and 12D show a related embodiment in which vane 1220 is externally mounted on the lifting surface, along with a set of fairings 1240. The vane is mounted via a set of hinges along its base; the set of hinges defining a pivot about which the vane is rotatable. The length of the vane may occupy a majority of the length of the trailing edge, or may be implemented in discrete independent segments along the trailing edge. A motor, mountable to the lifting surface and coupled to vane 1220, is used to adjust angular orientation of the vane about the pivot. In this embodiment, vane 1220 can be stored flush to lifting surface 30, as in FIG. 12D. Vane 1220 can then be deployed while simultaneously reducing the angle of attack of lifting surface 30 relative to the inflow in order to maintain the baseline lift. Vane 1220 can then be rotated by the motor at various angles between its fully deployed and stored positions, in order to vary the lift correspondingly from a maximum value to a minimum value. This embodiment makes possible a rapid decrease in lift in response to turbulence and gusts. Unlike the prior art in which various types of spoilers are used on the suction side of the blade to reduce lift, this embodiment does not suffer from lift hysteresis effects, making it particularly well-suited to application on wind turbine blades for the purpose of reducing unsteady loads due to wind shear, gusts, turbulence and the like.

Vane 1220 of FIGS. 12A-12D is caused to rotate about pivot 1230 by a geared DC motor, a stepper motor, a solenoid, a rotary actuator, a linear actuator, or some other prime mover (not shown), which collectively we call a "motor." When the angular position of vane 1220 is controlled by a DC motor, the vane 1220 can serve simultaneously as both a sensor and lift control device. In this context, the angular orientation of vane 1220 can be monitored with a shaft encoder or other suitable means. The angular position of vane 1220 is also required in order to detect system faults. The mechanical torque required to rotate vane 1220 from the horizontal to the vertical position, and the torque required to hold the vane in the vertical position, is proportional to the square of the wind speed, along the segment 1220, experienced by the vane. More generally, when the vane is at an angle $\theta$ with respect to the adjacent body of lifting surface 30, the force on the vane and therefore the torque required is then proportional to $\sin\theta$. The mechanical torque delivered by the DC motor via its shaft is proportional to the electrical current into the motor. In order to maintain a given angular orientation of the vane 1220, an increase in wind speed will therefore require an increase in the current to the motor. That current can be measured and used by the central controller as a proxy for wind speed. In turn, the angular orientation of the vane 1220 (and consequently the lift provided by the lifting surface) can be controlled by the central controller as a function of the wind speed (which in turn may be determined based on the measured motor current).

Providing maximum accessibility of all components is one objective of the embodiment of FIGS. 12C and 12D of the present invention. To that end, the motor is housed within a fairing that provides for smooth flow over its surface. To minimize parasitic drag losses, the fairing extends into the flow by a distance equal to no more than about 0.5-3% of the lifting surface chord length. To accomplish this, it is necessary to provide a small cut-out or slot in the lifting surface to accommodate the part of the motor housing that extends below the motor shaft. The protuberance into the flow can be minimized by utilizing a geared DC motor with a shaft that is offset from the motor's centerline. In many applications, such as on wind turbine blades, this arrangement is superior to housing the motor completely within the internal volume of the lifting surface and providing internal linkages to drive the lift control device, because the latter is mechanically complex and provides limited or no access for maintaining or replacing components. The possibility of employing embodiments of the present invention as a retrofit on existing lifting surfaces provides another benefit.

In some circumstances, the embodiment of FIGS. 12C and 12D of the present invention may be mounted on a flexible lifting surface such as the blade of a wind turbine. In those circumstances, it may be necessary for vane 1220 to accommodate as much as 5-10 centimeters of vertical deflection (i.e., deflection in a direction transverse to the longitudinal axis) of the lifting surface over the span of the lift control device.

Figure 13B:
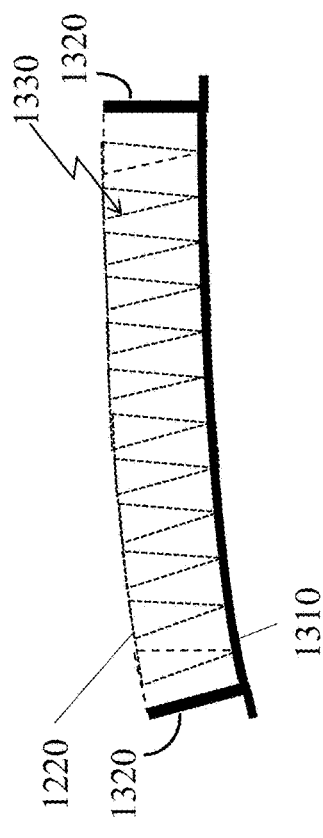
FIGS. 13A and 13B are side views (taken in a direction transverse to the longitudinal axis) of flexible vanes for use in the embodiments of FIGS. 12C and 12D.
Figure 13A:
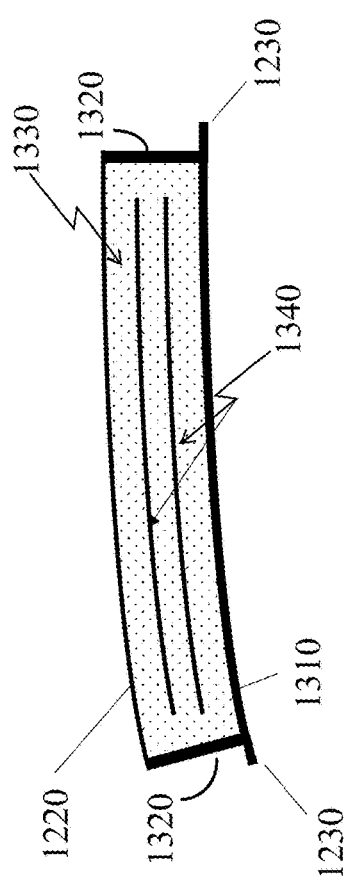

To accommodate flexing of the lifting surface in this context, we have developed flexible vanes in accordance with various embodiments of the present invention. FIGS. 13A and 13B are side views (taken in a direction transverse to the longitudinal axis) of such flexible vanes for use in the embodiments of FIGS. 12C and 12D. The vane of FIG. 13A accommodates flexing of the lifting surface using a frame, established by flexible lower segment 1310 connected to a set of stiff vertical elements 1320, to support material 1330, which is fabric or elastomeric or both. Embedded within the material are battens 1340, which provide longitudinal stiffness to the material to prevent excessive longitudinal bending in response to the aerodynamic forces.

Alternatively, as shown in FIG. 13B, vane 1220 can be constructed of overlapping elements 1330, which, for example, may be rigid and trapezoidal, each of which is attached to lower segment 1310 but is otherwise capable of sliding relative to adjacent elements.

Figure 14:
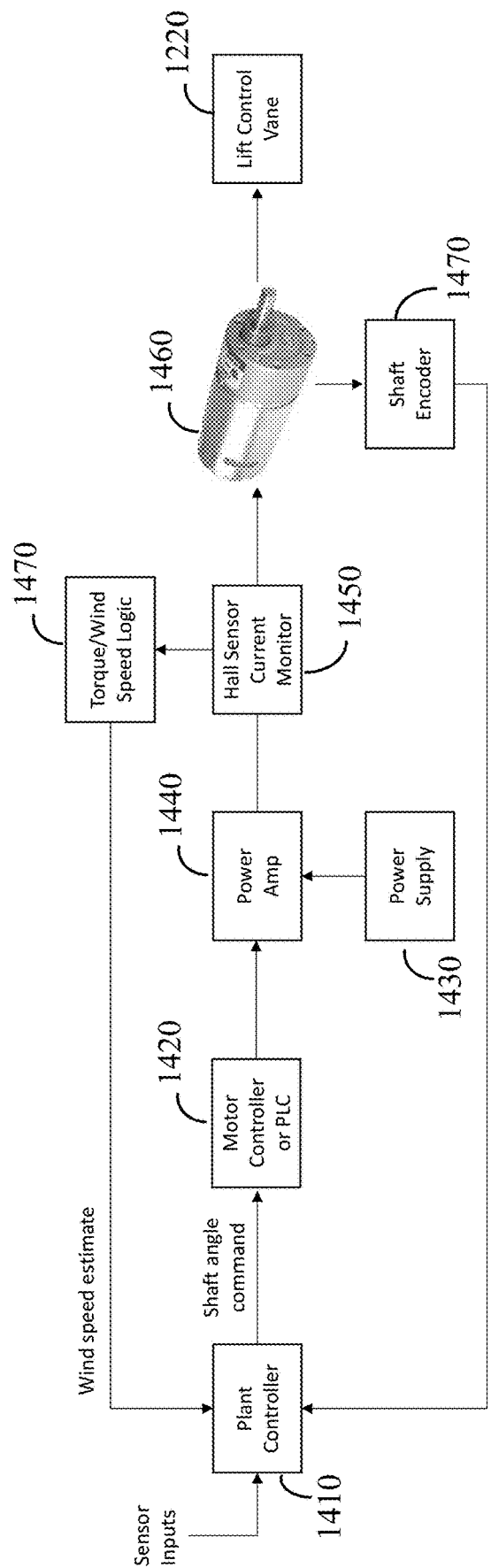
FIG. 14 is a schematic diagram for the embodiment of the present invention represented by FIGS. 12C and 12D.

FIG. 14 is a schematic diagram for use in the embodiment of FIGS. 12C and 12D of the present invention. Central plant controller 1410 receives inputs from various sensors (not shown) and outputs a shaft angle command to the motor assembly. The motor assembly, in turn, includes controller (or Programmable Logic Controller, PLC) 1420, power supply 1430, power amplifier 1440, current sensor 1450 and motor 1460. Current sensor 1450 sends its output to a computer (which can be the controller 1420 or a separate computing unit) which outputs a wind speed estimate to the plant controller 1410. Shaft encoder 1470 provides continuous updates of the shaft angle to plant controller 1410. Motor 1460 provides rotary motion and torque to lift control vane 1220.

FIGS. 15A and 15B are isometric mechanical drawings of the embodiment of FIGS. 12C and 12D of the present invention. FIG. 15A depicts the embodiment in its entirety. FIG. 15B is an exploded view, showing motor fairing 1520, motor assembly 1530, hinge-vane assembly 1540, bearing 1550, bearing side fairing 1560 and upstream fairing 1240.

Figure 16B:
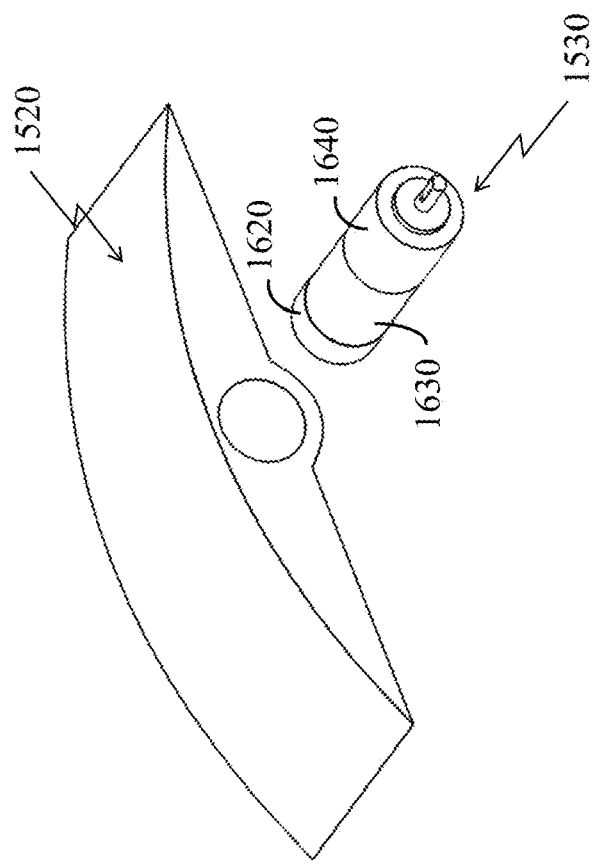
FIGS. 16A and 16B are isometric mechanical drawings of components of the embodiment of FIGS. 15A and 15B of the present invention.
Figure 16A:
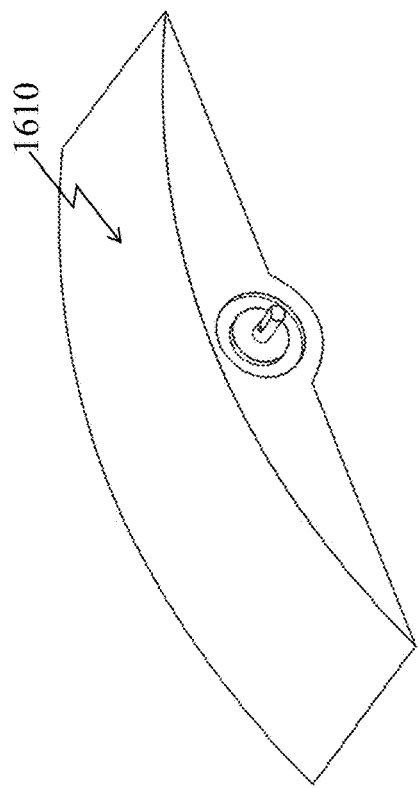

FIGS. 16A and 16B are isometric mechanical drawings of components of the embodiment of FIGS. 15A and 15B of the present invention. FIG. 16A shows motor fairing assembly 1610. FIG. 16B is an exploded view, showing fairing 1520 and motor assembly 1530. Motor assembly 1530 includes shaft encoder 1620, DC motor 1630, and gear assembly 1640.

Figure 17:
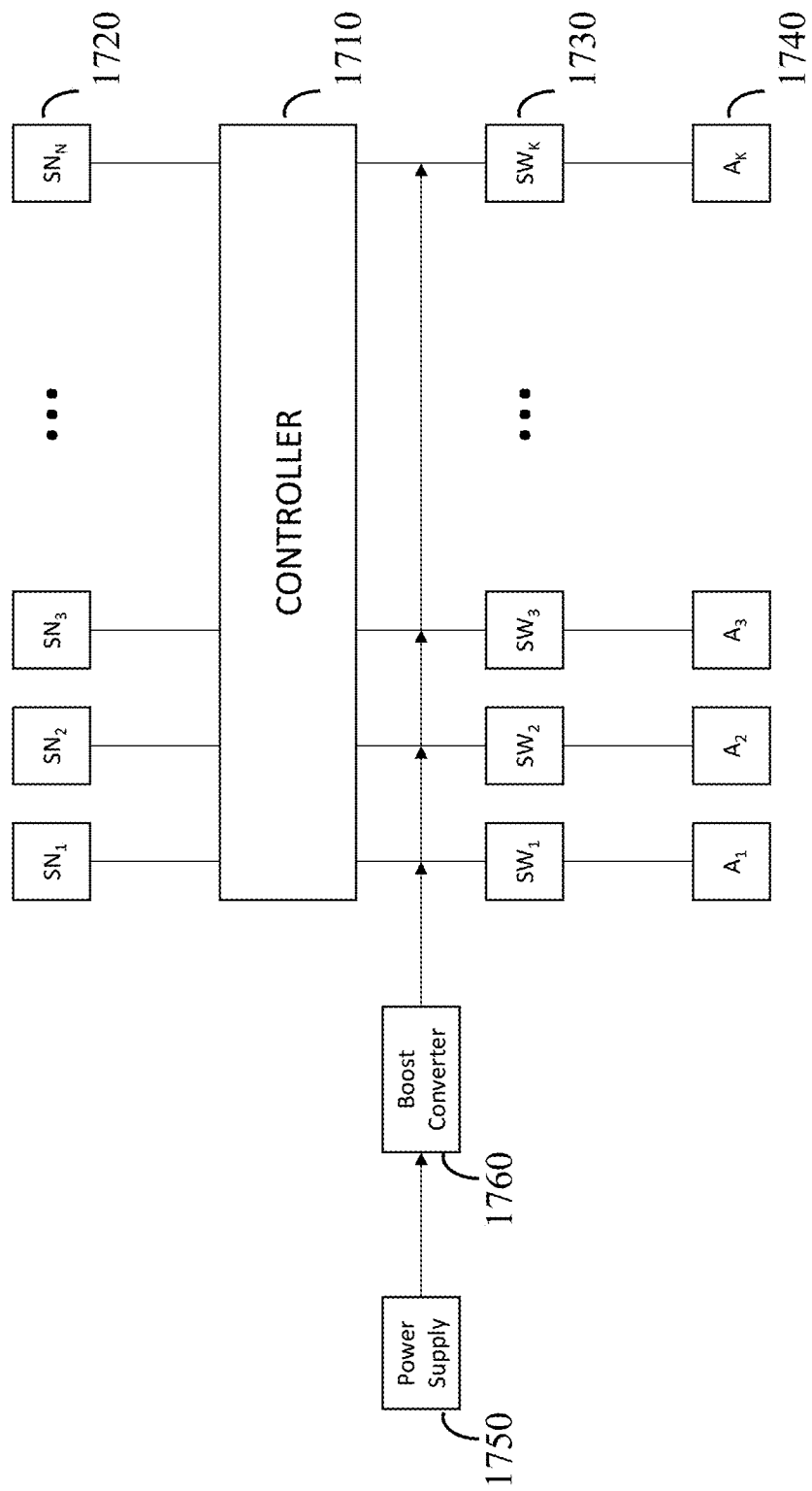
FIG. 17 is a block diagram of a system for electrically controlling unsteady loads on a lifting surface in accordance with an embodiment of the present invention.

FIG. 17 is a block diagram of a system for controlling lift on a lifting surface in accordance with an embodiment of the present invention. Computer controller 1710 collects data from some number, N, of sensors 1720. For example, in one embodiment, sensors 1720 are configured to measure bending stress at various locations on the lifting surface, or the incoming flow velocity, or other data that can be used by the control algorithms to determine suitable changes to the lift needed to meet the control objectives. Algorithms implemented in code housed on controller 1710 are used to derive command signals that are fed to the K actuator switches 1730. The data provided to the switches determine the state for the K actuators 1740. The actuator state is a numerical value, nominally between 0 and 1, representing the degree of lift between the minimum and maximum values to be provided by actuators 1740. Power supply 1750 provides a low-voltage DC signal, which is amplified by boost converter 1760. The high voltage signal from the boost converter is then sent to each of the K switches 1730. The switches then activate the K controllable lift devices $A_1, \ldots, A_K$.

Figure 18:
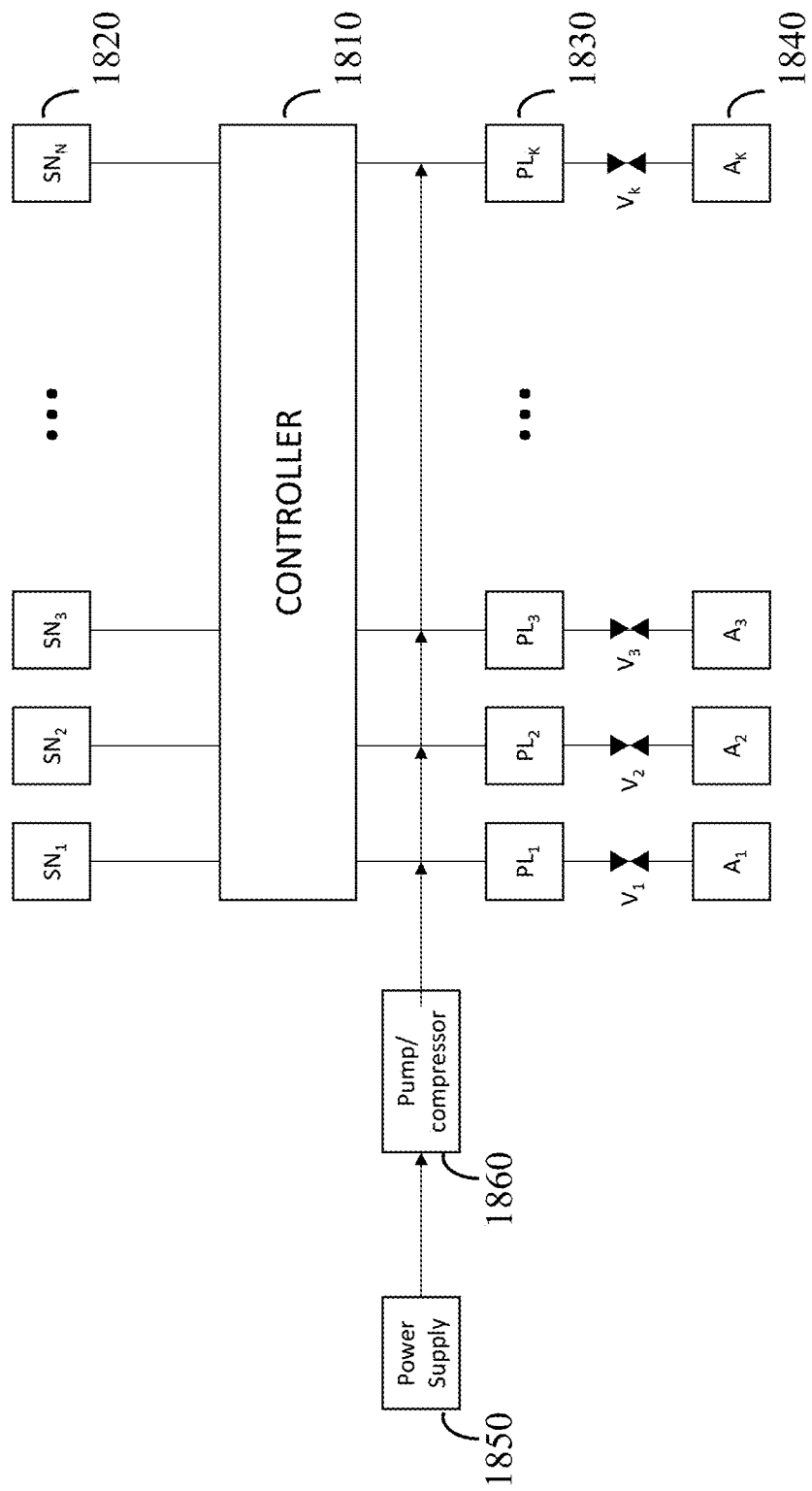
FIG. 18 is a block diagram of a system for pneumatically controlling unsteady loads on a lifting surface in accordance with an embodiment of the present invention.

FIG. 18 is a block diagram of a system for pneumatically controlling unsteady loads on a lifting surface in accordance with an embodiment of the present invention. As in FIG. 17, computer controller 1810 collects data from some number, N, of sensors (e.g., $SN_1, \ldots, SN_N$). In this case, power supply 1850 powers pump/compressor 1860, which pressurizes air in K plenums ($PL_1, \ldots, PL_K$). Valves $V_1, \ldots, V_K$ are commanded to open and close by the controller in order to activate controllable lift devices $A_1, \ldots, A_K$. Alternatively, pump/compressor 1860 connects directly to pneumatic actuators 1840 without intervening plena.

Figure 19B:
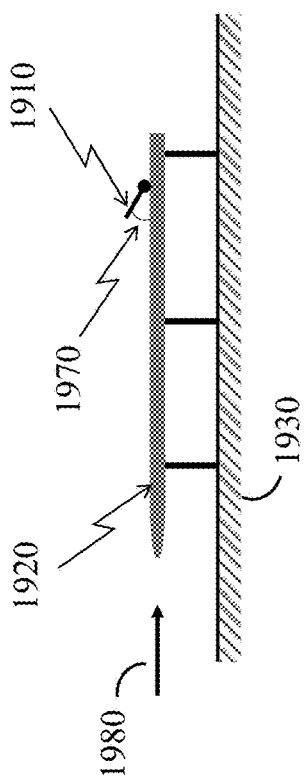
FIGS. 19A and 19B are a plan view and an edge view of an experimental apparatus used to measure the torque required to control vanes used in the embodiments of FIGS. 12C and 12D.
Figure 19A:
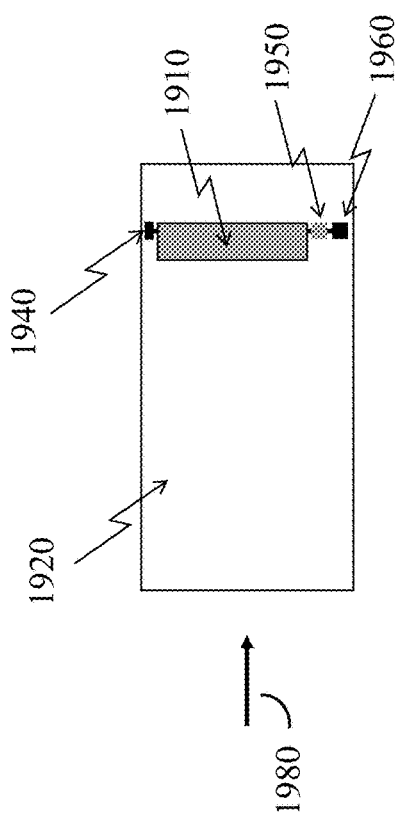

In laboratory experiments, the efficacy of the embodiment of this invention of FIGS. 12C and 12D has been established by quantitative measurement. Experiments were performed in a low-turbulence wind tunnel equipped to measure the aerodynamic forces on lifting surfaces. The first set of experiments quantified the torque required to actuate vane 1220 of FIGS. 12C and 12D. FIGS. 19A and 19B show planform and edge views of vane 1910 mounted on flat plate 1920, which is rigidly attached parallel to wind tunnel floor 1930. Flat plate 1920 is constructed of 12 mm (half-inch) thick plywood. Vane 1910 is constructed of glass reinforced fiber composite with a spanwise length of 600 mm and a width of 40 mm. In the experiment, vane 1910 was permitted to rotate about an axis located at its base near the surface of flat plate 1920, having bearing 1940 at one end of the axis and stepper motor 1960 at the opposite end. The flap angle was controlled by stepper motor 1960, which was attached to flat plate 1920. Torque sensor 1950 was mounted between stepper motor 1960 and vane 1910 and used to measure the torque required to hold vane 1910 at angle 1970 subtended between vane 1910 and the plane of flat plate 1920. In the experiments, vane 1910 was rotated between 0 and 180 degrees, where 0 degrees means that vane 1910 was parallel to flat plate 1920 with its outer tip facing upstream and 90 degrees means that vane 1910 was perpendicular to flat plate 1920. Inflow velocity 1980 was set to 20 m/s and 30 m/s, corresponding to Reynolds numbers based on the distance from the leading edge of $Re_x=1,588,000$ and $Re_x=2,382,000$, respectively.

Figure 20:
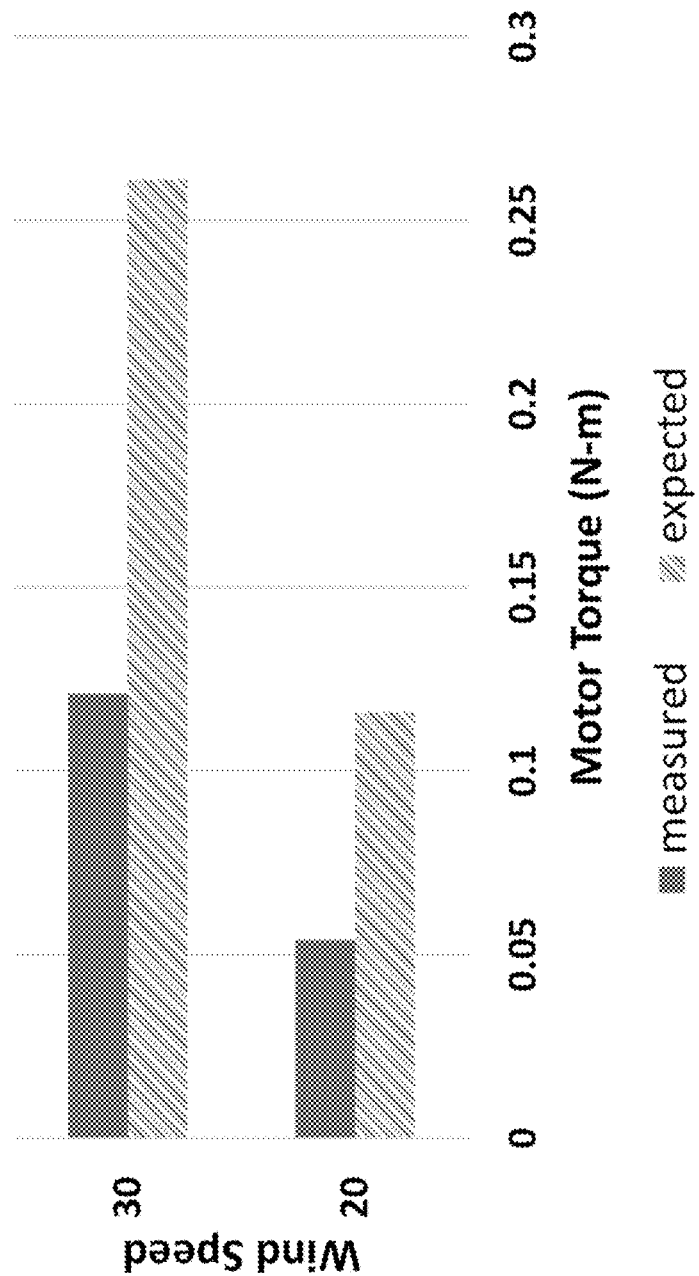
FIG. 20 is a graph plotting the torque required to turn the vane of the experimental apparatus of FIGS. 19A and 19B when the vane is deployed perpendicular to the flat plate.

FIG. 20 is a graph plotting the torque required to hold vane 1910 of the experimental apparatus of FIGS. 19A and 19B at angle 1970 equal to 90 degrees for two values of inflow velocity 1980 equal to 20 m/s and 30 m/s. An expected value was computed based on prior art empirical measurements of drag on a flat plate oriented perpendicular to a uniform free stream. This expected value is conservative because the drag on the vane will be lower due to the presence of the flat plate. In fact, we found that the measured torque was less than 50% of its expected value. This is an important result, confirming that that small motors can be employed to control the angle of the vane.

Figure 21:
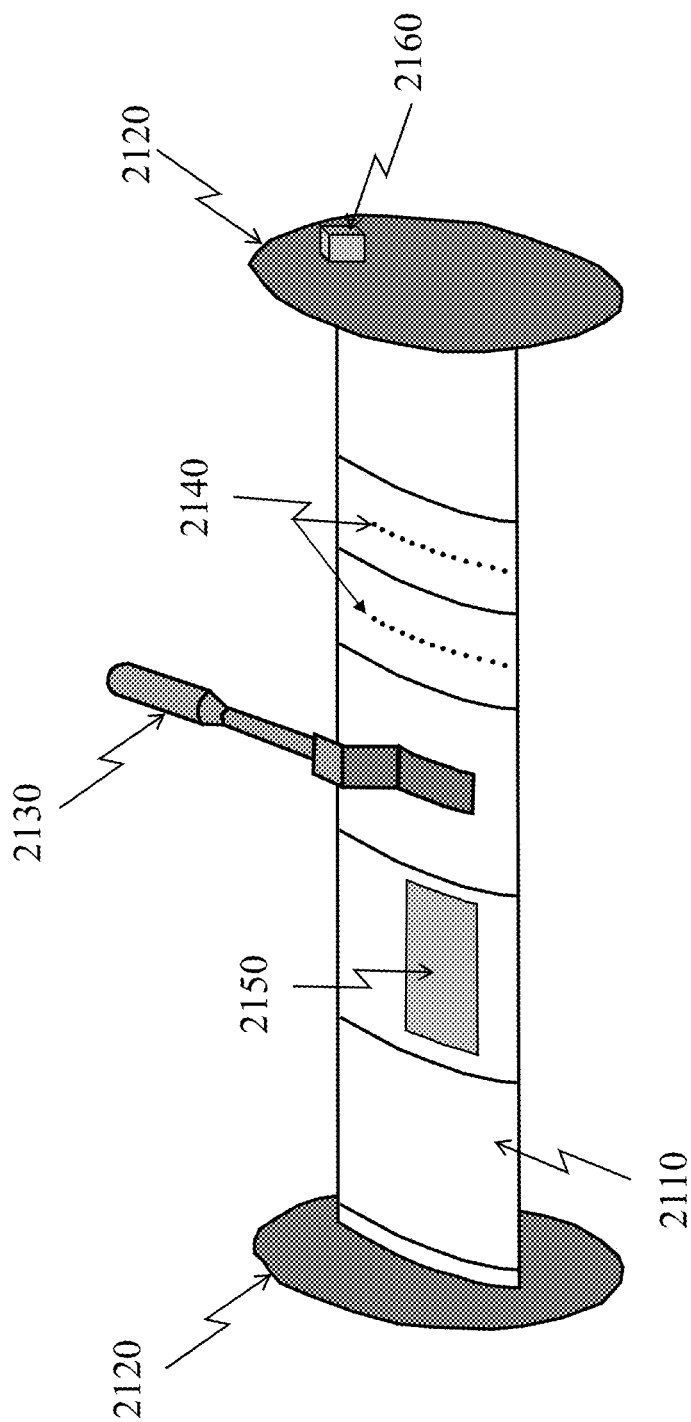
FIG. 21 is an isometric drawing of an experimental apparatus used to measure the aerodynamic forces as modified by the vanes used in the embodiments of FIGS. 12C and 12D.

Additional experiments were performed to quantify the changes in the aerodynamic forces experienced by a lifting surface using the embodiment of FIGS. 12C and 12D. FIG. 21 shows an isometric view of lifting surface 2110. End plates 2120 are fixed to either end of lifting surface 2110 to reduce the effects of the tip vortices on the aerodynamic forces. Lifting surface 2110 is mounted on sting 2130, which couples to a shaft connected to a force dynamometer. Lifting surface 2110 is equipped with pressure ports 2140 at two spanwise sections, suitable for measuring the pressure distribution on the surface. Pressure ports 2140 are connected by tubes in the interior of lifting surface 2110 to a pressure transducer located in internal cavity 2150. A vane (mounted on the side opposite of that shown in FIG. 21) similar to vane 1910 of the apparatus of FIGS. 19A and 19B was used to modify the aerodynamic forces experienced by lifting surface 2110. The angle of the vane relative to the surface of lifting surface 2110 was controlled by stepper motor 2160. The vane extends along the entire span of lifting surface 2110, has a height equal to 4% of the chord length of lifting surface 2110, and is located on the pressure surface at a distance, downstream from the leading edge, equivalent to 96.5% of the chord length.

Figure 22:
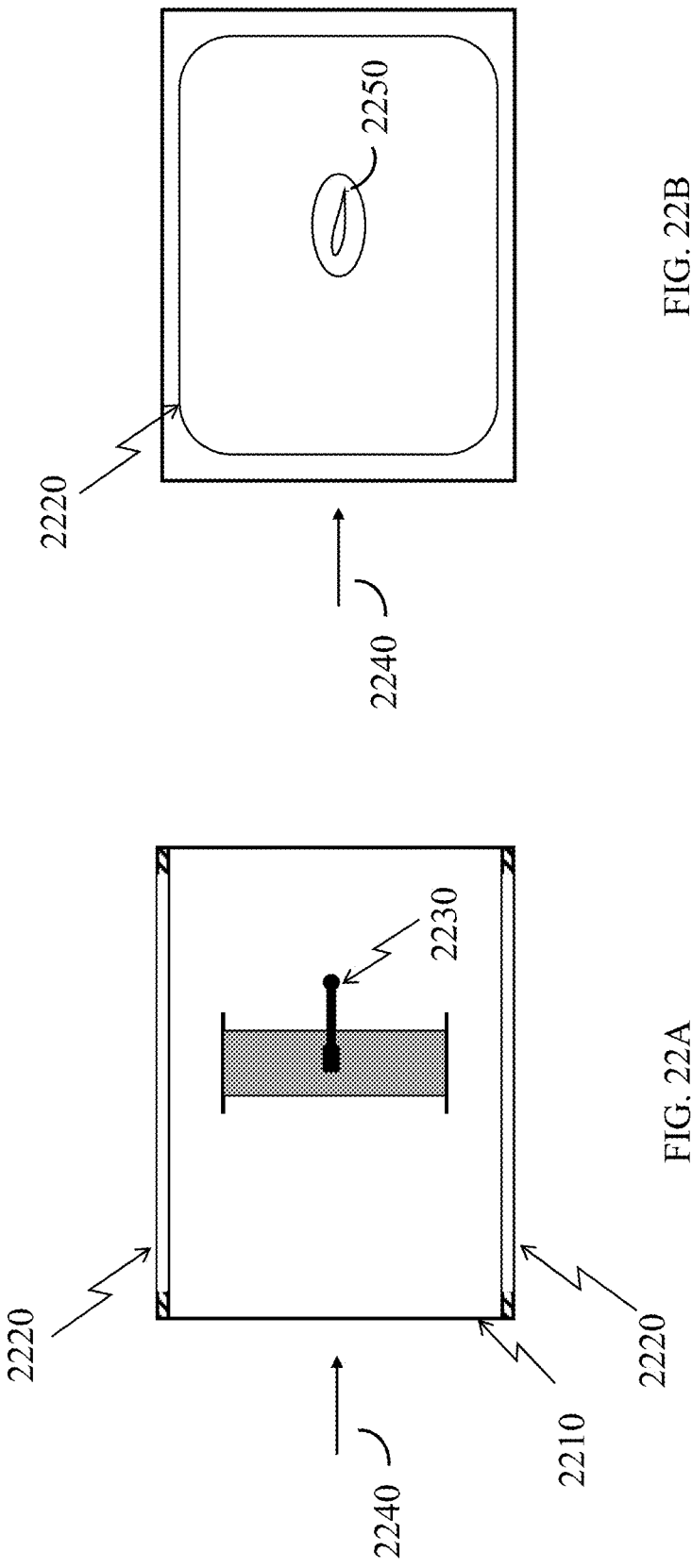
FIGS. 22A and 22B are a plan view and an edge view of the experimental apparatus of FIG. 21 mounted in a wind tunnel.
Figure 23:
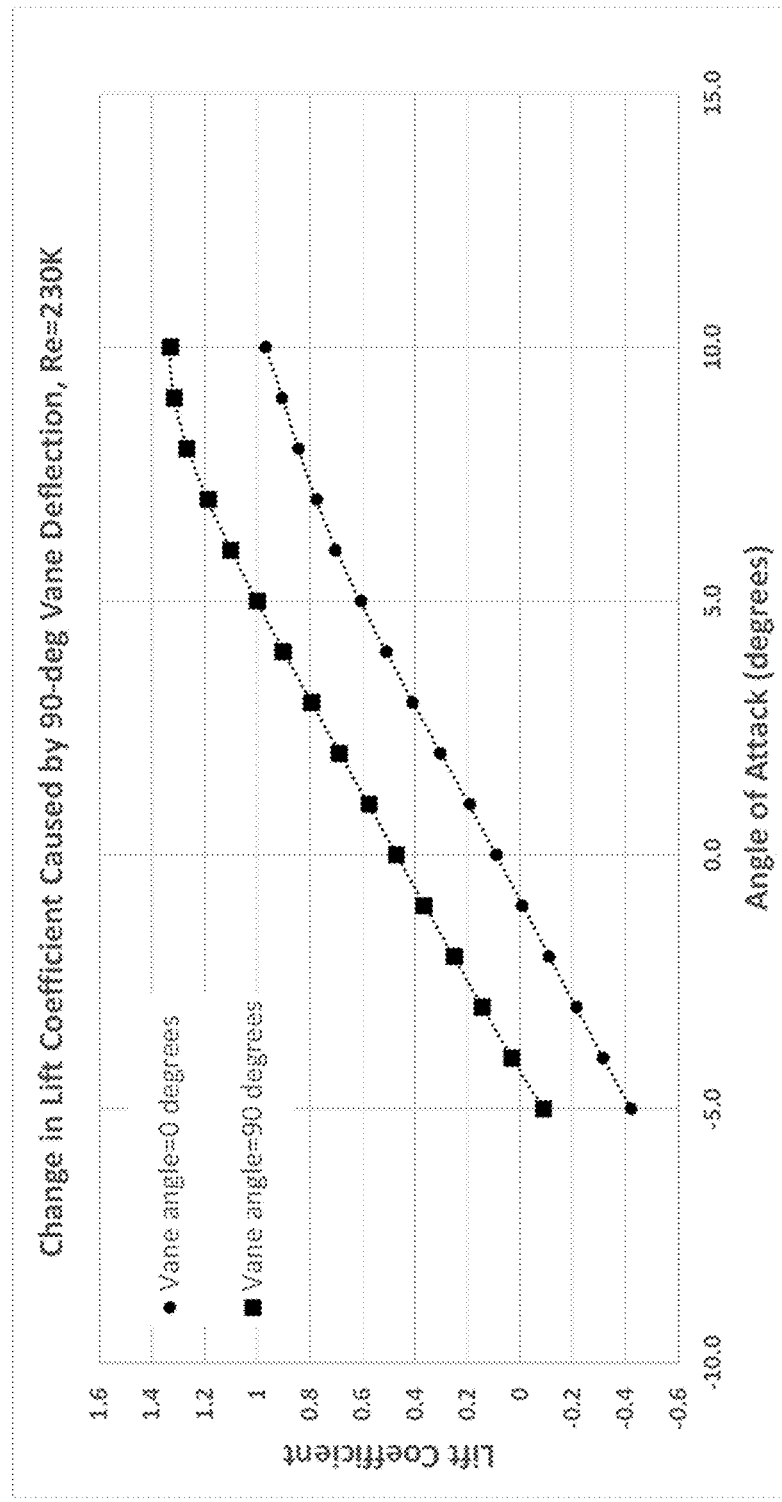
FIG. 23 is a graph plotting the aerodynamic lift force experienced by the wing in the experimental apparatus of FIGS. 21 and 22 as a function of the angle of attack of the lifting surface.

FIGS. 22A and 22B show planform and edge views of the apparatus of FIG. 21 mounted in test section 2210 of a low-turbulence wind tunnel. Test section 2210 is equipped with glass walls 2220 on either side. Lifting surface 2110 of FIG. 21 is mounted on shaft 2230, which is connected to a force transducer (not shown). Tunnel wind speed 2240 is controlled by the wind tunnel impeller (not shown). In the experiments, tunnel speed 2240 was set to 15 m/s (corresponding to a Reynolds number based on chord length of 230,000) and the angle of attack of the lifting surface was varied between −5 degrees and 10 degrees. Vane 2250 was held in in two angular positions: 0 degrees (flat against the lifting surface with the outer tip of the vane pointing downstream) and 90 degrees (perpendicular to the lifting surface). FIG. 23 shows a plot of the resulting lift coefficient as a function of angle of attack with the vane in the two angular positions. At angle of attack equal to 5 degrees, for example, the change in lift coefficient due to the vane is 0.4. The test results confirm our view that vane deflection in the above embodiments provides a practical method of rapidly controlling the lift coefficient over a wide range of operating conditions.

Embodiments of the invention as described can be applied on the suction side of an airfoil or the pressure side, or both the pressure and suction sides. When applied on the pressure side, the device can be used to vary the lift from its nominal value (the baseline lift without the device), to the higher maximum lift achieved with the device. When applied on the suction side, the device can be used to vary the lift from its baseline value to a lower minimum lift achieved with the device.

The embodiments of the invention described above are intended to be merely exemplary; numerous variations and modifications will be apparent to those skilled in the art. All such variations and modifications are intended to be within the scope of the present invention as defined in any appended claims.

We claim:

1. A lift control device for actively controlling lift of a lifting surface when the lift control device is mounted to the lifting surface, the lifting surface being part of a blade of a wind turbine and movable relative to a fluid medium so as to define a leading edge and a trailing edge, the lifting surface also having a pressure surface thereof and a vacuum surface thereof, the leading edge and the trailing edge running along a span of the lifting surface, the trailing edge having a length and defining a longitudinal axis, the lift control device comprising:

a longitudinally disposed vane, the vane having a base and a length;

a set of hinges affixed to the base of the vane;

wherein the base is configured to be mounted to the pressure surface of the lifting surface of the blade of the wind turbine, near the trailing edge of the lifting surface of the blade of the wind turbine, via the set of hinges along the base, the set of hinges defining a pivot about which the vane is rotatable, the vane creating a region of separated flow downstream of the vane, such region having the effect of increasing lift produced by the lifting surface of the blade of the wind turbine when the vane is at a non-zero angle with respect to the pressure surface of the lifting surface of the blade of the wind turbine;

a motor, mountable to the lifting surface of the blade of the wind turbine and coupled to vane, the motor configured to adjust angular orientation of the vane about the pivot, the angular orientation controlling the extent of lift increase produced by the vane; and a controller, coupled to the motor, and configured to control rotation of the motor and therefore angular orientation of the vane about the pivot, so that the controller controls lift of the lifting surface by controlling angular orientation of the vane.

2. The lift control device according to claim 1, further comprising: a shaft encoder, coupled to the vane and to the controller, that provides to the controller a signal related to angular orientation of the vane about the pivot; a control line, coupled to the motor, that provides an electrical signal related to torque being produced by the motor, the control line coupled to the controller; wherein the controller is configured to use the electrical signal on the control line to determine a quantity related to wind speed experienced by the vane over the pressure surface and to use the determined quantity to control angular orientation of the vane, as measured via the shaft encoder, so as to adjust lift of the lifting surface in relation to the wind speed.

3. The lift control device according to claim 1, further comprising a set of fairings mountable to the lifting surface with respect to the vane so as to smooth flow over the vane.

4. The lift control device according to claim 1, wherein the vane is flexible so as to accommodate flexing of the lifting surface along its longitudinal axis.

5. The lift control device according to claim 4, wherein the vane includes a plurality of discrete, overlapping elements.

6. The lift control device according to claim 1, wherein the length of the vane occupies a majority of the length of the trailing edge.

\* \* \* \* \*